(12) United States Patent
Santos et al.

(10) Patent No.: US 10,838,954 B1
(45) Date of Patent: Nov. 17, 2020

(54) IDENTIFYING USER CONTENT

(71) Applicant: Amazon Technologies, Inc., Seattle, WA (US)

(72) Inventors: Jose Alejandro Dario Santos, Seattle, WA (US); Corinne Russell, Seattle, WA (US); Nicholas Martin Peters, Jr., Seattle, WA (US); Catherine Michelle Loo, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 111 days.

(21) Appl. No.: 15/841,878

(22) Filed: Dec. 14, 2017

(51) Int. Cl.
*G06F 16/242* (2019.01)
*G10L 15/22* (2006.01)
*G10L 15/30* (2013.01)
*G10L 15/18* (2013.01)
*G06F 3/16* (2006.01)

(52) U.S. Cl.
CPC ............ *G06F 16/243* (2019.01); *G06F 3/167* (2013.01); *G10L 15/1815* (2013.01); *G10L 15/22* (2013.01); *G10L 15/30* (2013.01)

(58) Field of Classification Search
CPC ... G06F 16/243; G06F 3/167; G10L 15/1815; G10L 15/22; G10L 15/30
See application file for complete search history.

(56) References Cited

U.S. PATENT DOCUMENTS

| | | | | |
|---|---|---|---|---|
| 6,859,776 | B1* | 2/2005 | Cohen | H04M 3/493 704/270 |
| 7,660,416 | B1* | 2/2010 | Kline | G06Q 10/10 380/216 |
| 8,719,039 | B1* | 5/2014 | Sharifi | G10L 15/08 704/275 |
| 2002/0199121 | A1* | 12/2002 | Stanford-Clark | H04L 63/0428 726/4 |
| 2007/0288518 | A1* | 12/2007 | Crigler | G06F 16/4387 |
| 2009/0070197 | A1* | 3/2009 | Ermolli | G06Q 10/00 705/7.29 |
| 2009/0228600 | A1* | 9/2009 | MacFarlane | H04L 65/4084 709/231 |
| 2009/0254618 | A1* | 10/2009 | Arnold | G06F 16/951 709/206 |
| 2012/0143911 | A1* | 6/2012 | Liebald | G06F 3/0482 707/771 |
| 2013/0275875 | A1* | 10/2013 | Gruber | G10L 15/22 715/728 |
| 2014/0372748 | A1* | 12/2014 | Dixon | H04L 63/0471 713/153 |

(Continued)

Primary Examiner — Fariba Sirjani
(74) Attorney, Agent, or Firm — Lee & Hayes, P.C.

(57) ABSTRACT

This disclosure describes, in part, techniques for identifying user-specific content items and/or time-based content items, as well as techniques for providing the content items to the user. For instance, a remote system may receive first audio data from an electronic device, where the first audio data represents a request to identify content related to a topic. The remote system can then store the topic in a database and use the topic to identify the content. Later, the remote system can then receive second audio data from the electronic device, where the second audio data represents a request for the content. The remote system can then send third audio data to the electronic device that represents at least a portion of the content.

20 Claims, 17 Drawing Sheets

(56) References Cited

U.S. PATENT DOCUMENTS

| | | | |
|---|---|---|---|
| 2015/0110461 A1* | 4/2015 | Maisenbacher | G11B 27/19 386/230 |
| 2015/0347920 A1* | 12/2015 | Medlock | G06N 7/005 706/12 |
| 2016/0034585 A1* | 2/2016 | Rokhlenko | G06Q 30/02 707/728 |
| 2016/0188703 A1* | 6/2016 | Huang | G06F 16/35 707/750 |
| 2016/0217408 A1* | 7/2016 | Garrity | G06F 3/0482 |
| 2016/0224557 A1* | 8/2016 | Chi | G06F 16/972 |
| 2017/0329762 A1* | 11/2017 | Lintz | H04N 21/2747 |
| 2017/0358302 A1* | 12/2017 | Orr | G06F 16/433 |
| 2017/0374135 A1* | 12/2017 | Culverhouse | H04L 67/10 |
| 2018/0083928 A1* | 3/2018 | Wilson | G06Q 30/0255 |
| 2018/0181572 A1* | 6/2018 | Guo | G06F 16/9535 |
| 2018/0276561 A1* | 9/2018 | Pasternack | G06N 20/00 |
| 2018/0336904 A1* | 11/2018 | Piercy | G10L 17/22 |
| 2018/0343495 A1* | 11/2018 | Loheide | H04L 65/60 |

\* cited by examiner

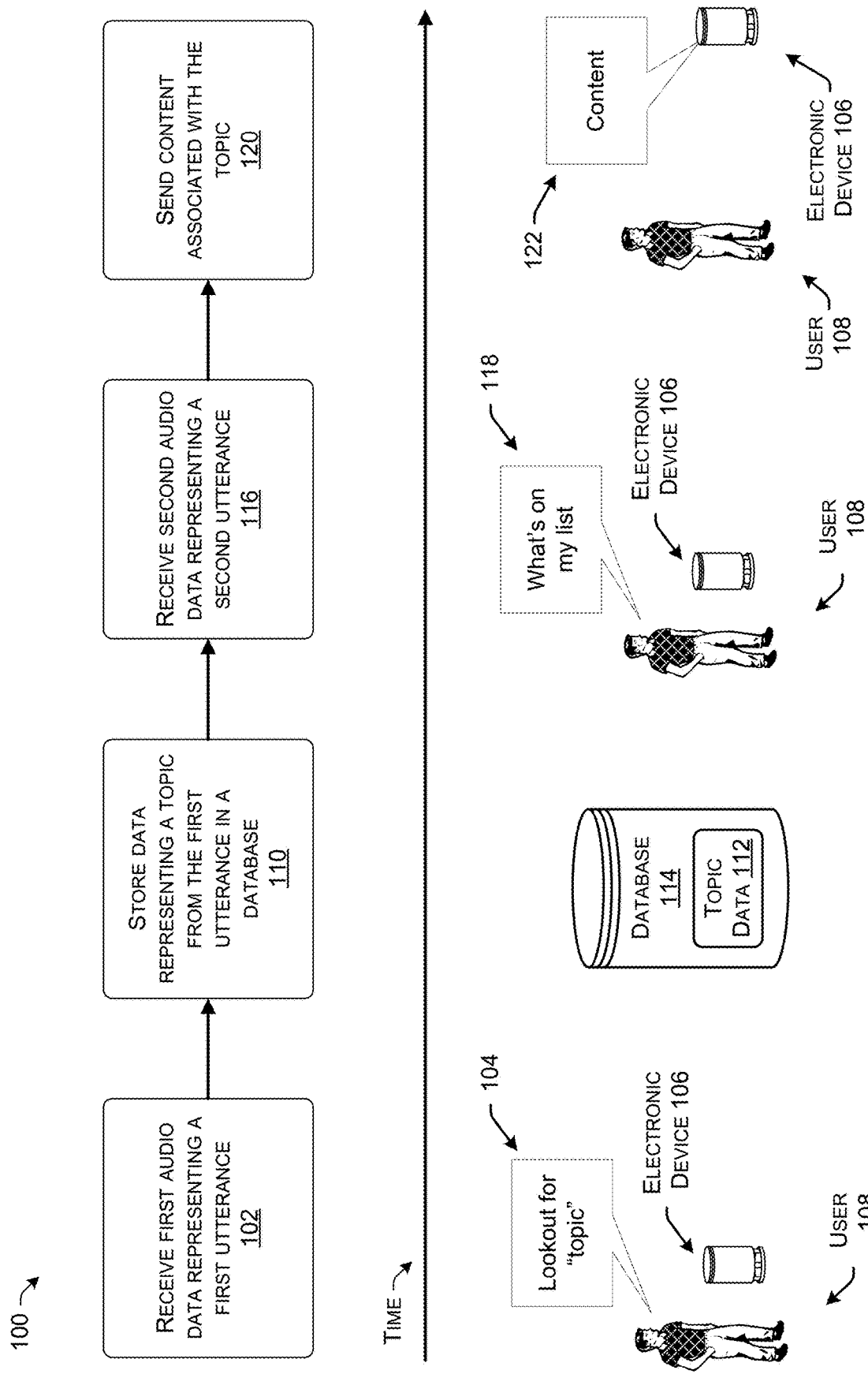

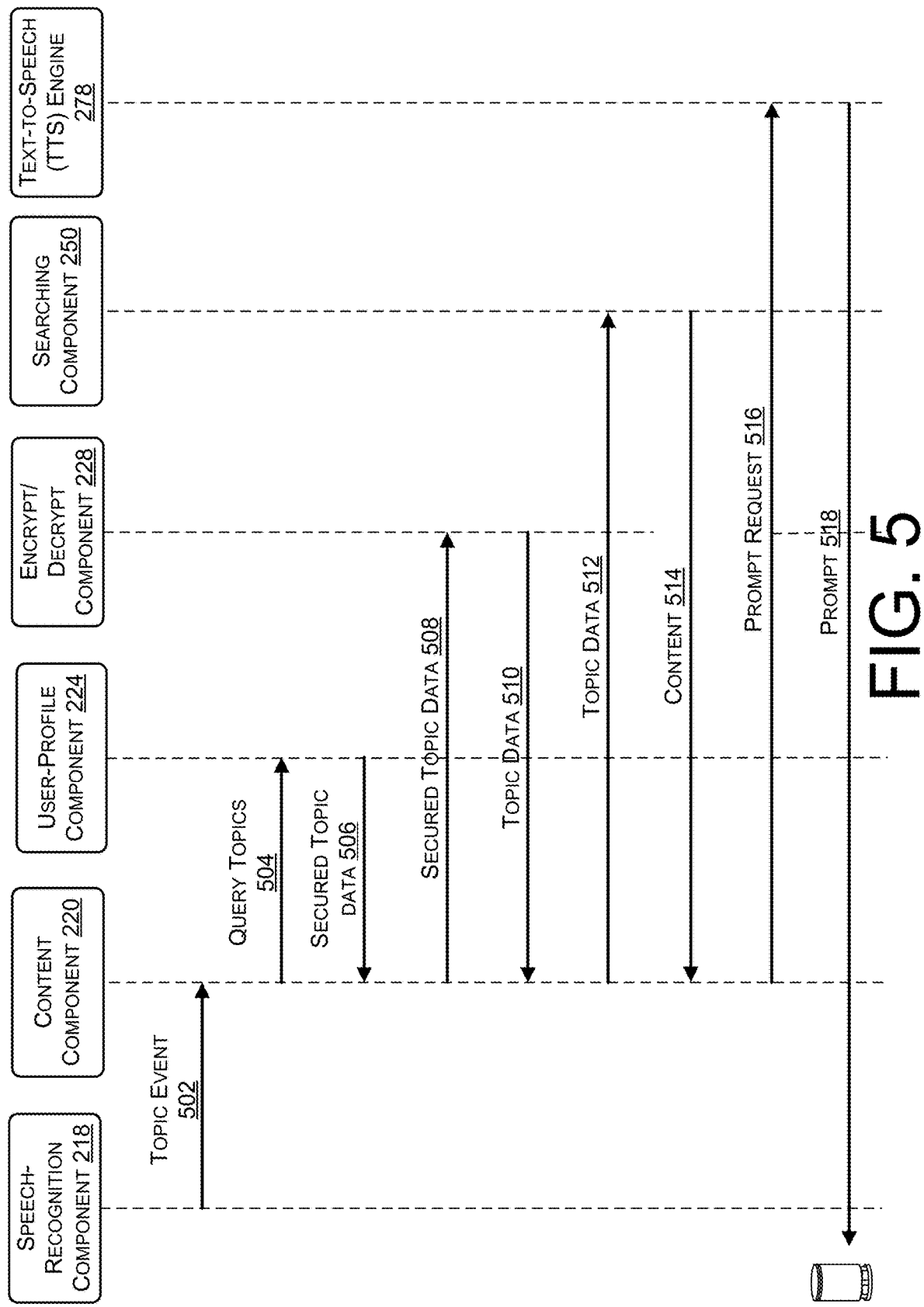

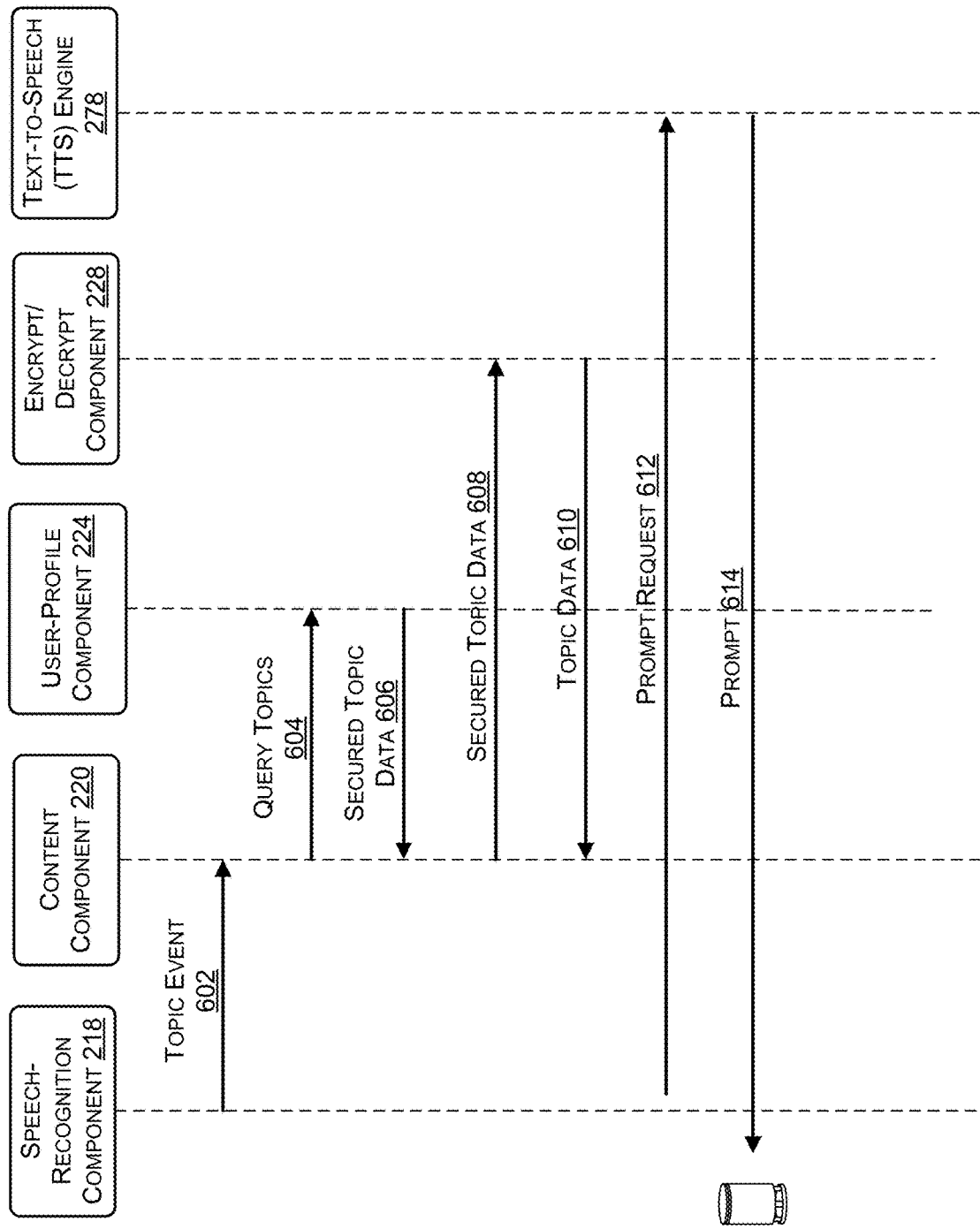

US 10,838,954 B1

IDENTIFYING USER CONTENT

BACKGROUND

As the processing power available to devices continues to increase, it has become practical to interact with users in new ways. For example, it is becoming easier for machines to interact with users through spoke and synthesized speech. Many devices are now capable of receiving and responding to voice commands, including personal computers, smartphones, tablet devices, media devices, entertainment devices, industrial systems, voice-based assistants, and so forth. In some instances, a user may interact with a device using such voice commands to cause the device to output news, weather, and/or other types of information.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 is an example process for adding a topic to a list of topics, and then retrieving content related to the topic.

FIG. 5 is a schematic diagram of an example process for retrieving content related to a topic.

FIG. 6 is a schematic diagram of an example process for retrieving a list of topics.

DETAILED DESCRIPTION

Figure 2A:
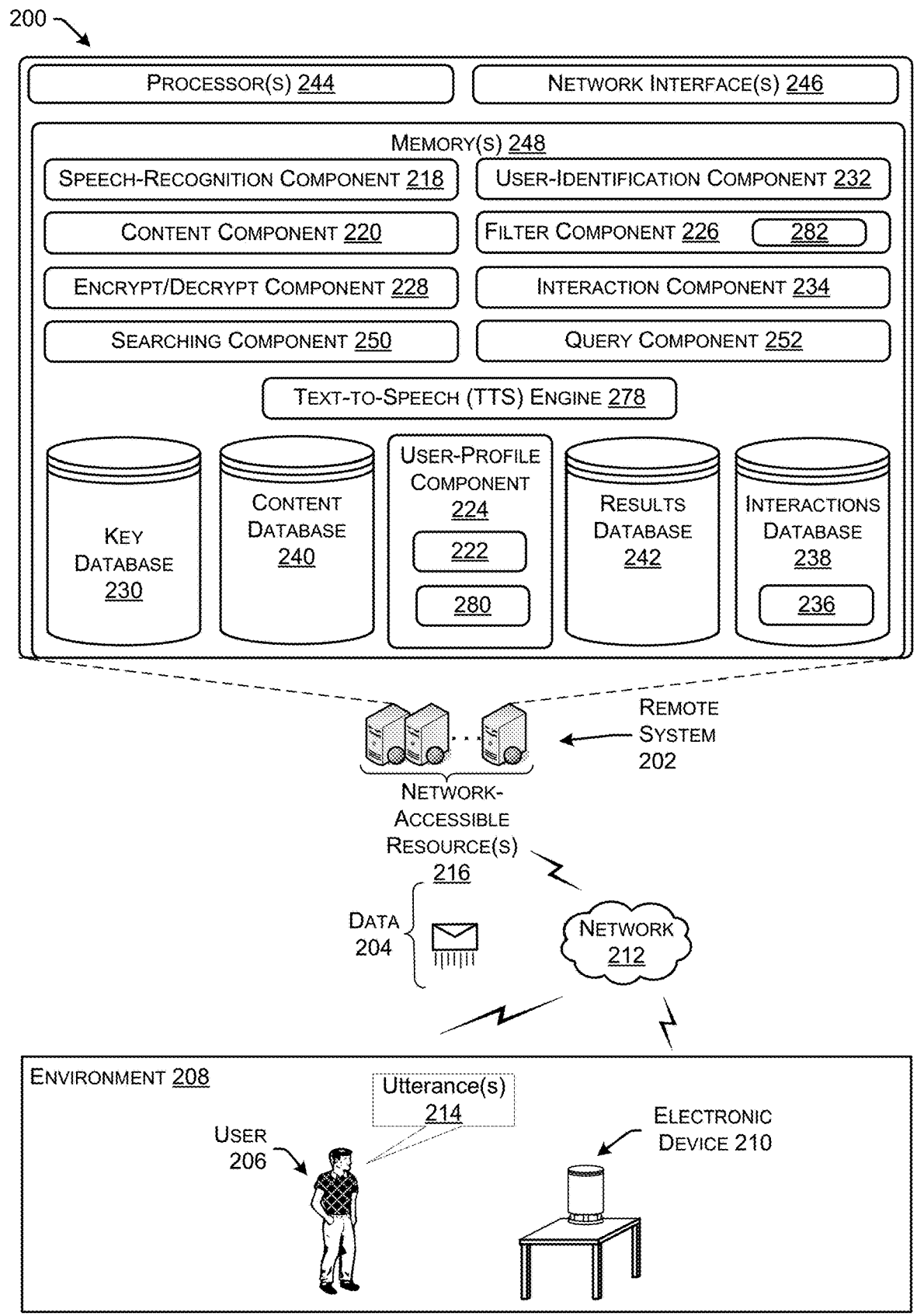
FIG. 2A is a schematic diagram of an example architecture that includes a remote system analyzing audio data in order to generate one or more topics for use in identifying content.

This disclosure describes, in part, techniques for identifying user-specific content items and/or time-based content items, as well as techniques for providing the content to the user. For instance, a user of an electronic device (e.g., a voice-controlled device) may desire to receive content associated with a topic. Topics can include people, places, movies, music, weather, politics, automobiles, and/or the like. To receive the content, the user can use the electronic device to send data to a remote system, which may search for and store the content associated with the topic. For instance, the electronic device may generate first audio data representing a first utterance (e.g., user speech) from the user. A first portion of the first utterance may correspond to a predefined word and/or phrase indicating that the user is going to provide the topic to the remote system. For example, and without limitation, the first portion of the first utterance may include the phrase "lookout for" or the phrase "add this to my list." A second portion of the first utterance may correspond to a word and/or phrase corresponding to the topic that the user desires the remote system to output related content when asked or proactively. The electronic device can then send the first audio data to the remote system for analysis.

For instance, the remote system may receive the first audio data from the electronic device and perform speech recognition on the first audio data to identify the first utterance. The remote system can then identify that the first portion of the first utterance includes the predefined word and/or phrase, such as "lookout for" or "add this to my list." This predefined word and/or phrase may indicate to the remote system that the next portion of the first utterance includes the topic for which the user desires related content. For instance, after identifying the predefined word and/or phrase, the remote system can identify the second portion of the first utterance, which may include the topic for which the user desires the related content. For example, the second portion of the first utterance may include a person's name, such as "Keanu Reeves." For a second example, the second portion of the first utterance may include a popular movie title, such as "Fast and the Furious." The remote system can then add the topic to a list of topics associated with a user profile. In some instances, the remote system adds the topic by storing data (e.g., referred to as "topic data") in a database that indicates the topic. In some instances, the topic data can include the entire first utterance and/or a portion of the first utterance, such as the second portion of the first utterance. In some instances, the remote system can generate data that indicates the topic and store the generated data in the database.

In some instances, the remote system first encrypts the topic data before storing the topic data in the database. Additionally, or alternatively, in some instances, the remote system associates the topic data with an identifier of the user profile that provided the first utterance. For example, the remote system may identify the user profile using data received from the electronic device, such as data indicating the identity (e.g., name) associated with the user profile. For instance, before sending and/or after sending the first audio data to the remote system, the remote system may send the remote system audio data that includes an utterance (e.g., user speech) identifying the user profile. For another example, the remote system may identify the user profile by processing the first audio data using speech recognition and/or voice recognition. In either example, after identifying the user profile, the remote system can store data that associates the topic data (which may be encrypted) with the identifier of the user profile in the database.

In some instances, after storing the topic data in the database, the remote system can proactively perform one or more searches using the topic data to identify content associated with the topic, where the content can include one or more content items. Depending on the topic, content items can include news, articles, books, music, videos, documents, information, and/or any other type of content that can be identified by a system performing a search. In some instances, content items associated with the topic can include content that references the topic. For example, a content item may be associated with the topic when the content item includes one or more words and/or phrases that match the topic. For another example, a content item may be associated with the topic when the content item includes a reference to the topic. In some instances, the remote system performs the one or more searches using local database(s) that store content items. Additionally, or alternatively, in some instances, the remote system performs the one or more searches using remote services. For example, the remote system can perform the one or more searches using database(s) associated with one or more remote and/or third-party resources.

The remote system may store the identified content items in a database, which may include a similar and/or different database than the databased used to store the topic data. In some instances, the remote system continues to store the content items until an occurrence of an event. For example, the remote system may store the content items in the database for a threshold period of time. The threshold period of time can include, but is not limited to, one hour, one day, one week, one month, and/or the like. For a second example, the remote system may store the content items in the database until the remote system provides the content items to the user (which is described in detail below). Still, for a third example, the remote system may store the content items in the database until the remote system determines that the content items are no longer relevant. In such an example, the remote system may determine that the content items are no longer relevant when the remote system identifies new versions of the content items. For example, if a content item includes the weather on a particular day, such as a Tuesday, the remote system may determine that the content item is no longer relevant when the remote system identifies the weather for the next day (e.g., a new content item), such as Wednesday.

In some instances, the remote system may use similar processes and/or techniques to store topic data for one or more additional topics in the database. Additionally, the remote system may use similar processes and/or techniques to identify content associated with the one or more additional topics. In some instances, the remote system may generate a list of topics and store the list of topics in the database (e.g., the database described above that stores the topic). The list of topics can include an indication of each topic provided by the user and/or an indication that each topic is associated with the user profile. The remote system may then use the list of topics to proactively perform one or more searches to identify content that is associated with all of the topics included in the list of topics.

The user can then use the electronic device (and/or an additional electronic device, such as a second voice-controlled device) to consume (e.g., view, listen to, etc.) the content items that are stored by the remote system. For instance, the electronic device may generate second audio data representing a second utterance from the user. The second utterance can include a request for the content items associated with the topic. In some instances, the request may be specific to the topic. For example, and using the example above where the topic includes "Keanu Reeves", the second utterance may include, but is not limited to, "Please provide me with content associated with Keanu Reeves" or "What did you find about Keanu Reeves". In some instances, the request may be general to all of the topics that are associated with the user profile. For example, the second utterance may include "What stories did you find", "What's on my lookout list", "What's up", or "What's trending".

The remote system can receive the second audio data from the electronic device. In response, the remote system can perform speech recognition on the second audio data to identify the second utterance. The remote system can then analyze the second utterance to determine that an intent associated with the second utterance is to receive content associated with at least one of the topics. In some instances, based on identifying the intent, and when the remote system proactively retrieves content items associated with the at one topic, the remote system can retrieve the content items from the database and provide the content items to the user. In some instance, when the request is specific to the topic, the remote system can retrieve the content items associated with the topic and provide those content items to the user. In some instances, when the request is general for all topics stored in the database, the remote system can retrieve content items that are stored in the database (which may include all of the content items) for all topics and provide those content items to the user.

In some instances, in addition to or alternatively from proactively searching for content, the remote system may search for the content in response to determining the intent of the second audio data. For example, if the request is for content related to a topic, the remote system can determine the intent of the second audio data and then perform a search for content items related to the topic (using similar processes as described above). For another example, if the request is for content related to more than one topic, such as all of the topics that are included in the list of topics associated with the user profile, the remote system can determine the intent of the second audio data and then perform a search for content items that are related to each of the topics. In either example, the remote system can then provide the content items to the user.

In some instances, when the electronic device includes a voice-controlled device that does not include a display, providing a content item may include generating third audio data that represents the at least the portion of the content item. For example, the remote system may process text of the content item generate the third audio representing synthesized speech. The remote system can then send the third audio data to the electronic device for output by the electronic device. In some instances, when the electronic device includes a display, providing a content item may include generating image data that represents at least a portion of the content item. The remote system can then send the image data to the electronic device for display by the electronic device. Still, in some instances, providing a content item may include generating and sending both the third audio data and the image data to the electronic device.

In some instances, the remote system only provides a portion of the content items to the user. For examples, if the remote system identifies fifty content items (e.g., fifty articles) related to one or more topics stored in the database, the portion of the content items may include ten content items. In some instances, the remote system can determine which content items to send to the electronic device using one or more factors that order the content items stored in the database. For example, the remote system may order the content items based on which content items are most relevant to the one or more topics stored in the database. Based on the order, the remote system can then send the top five, ten, twenty, one hundred, and/or the like content items to the electronic device. For another example, the remote system may order the content items based on the recency of each content item. Again, based on the order, the remote system can then send the top five, ten, twenty, one hundred, and/or the like content items to the electronic device.

In some instances, when remote system only provides a portion of the content items, the user can send a request to the remote system for additional content items. For instance, the electronic device can generate fourth audio data representing a third utterance from the user. The third utterance can include a request for additional content items stored by the remote system. The electronic device can then send the fourth audio data to the remote system. In response, the remote system can receive the fourth audio data from the electronic device and perform speech recognition on the fourth audio data to identify the third utterance. Additionally, the remote system can determine that an intent of the third utterance is to receive additional content items. Based on identifying the intent, the remote system can provide additional content items to the user. In some instances, the remote system provides the additional content items by generating fifth audio data representing the additional content items and sending the fifth audio data to the electronic device. Additionally, or alternatively, in some instances, the remote system provides the additional content items by generating image data representing the additional content items and sending the image data to the electronic device.

Additionally, or alternatively, in some instances, the remote system may provide portions of each content item to the electronic device. For example, if the remote system determines to send ten content items to the electronic device, the remote system may identify a respective portion from each of the content items, such as the title, the summary, the first paragraph, and/or the like. The remote system can then send the respective portion of each of the content items to the electronic device. For another example, and again if the remote system determines to send the ten content items to the electronic device, the remote system may generate a respective summary for each of the content items. The remote system can then send the respective summary for each of the content items to the electronic device.

In some instances, when the remote system only provides a portion of a content item, the user can request for an entirety of the content item from the remote system. For instance, the electronic device can generate sixth audio data representing a fourth utterance from the user. The fourth utterance can include a request for the entirety of the content item. The electronic device can then send the sixth audio data to the remote system. In response, the remote system can receive the sixth audio data from the electronic device and perform speech recognition on the sixth audio data to identify the fourth utterance. Additionally, the remote system can determine that an intent of the fourth utterance is to receive the entirety of the content item. Based on identifying the intent, the remote system and provide the entirety of the content item to the user. In some instances, the remote system provides the entirety of the content item by generating seventh audio data representing the entirety of the content item and sending the seventh audio data to the electronic device. Additionally, or alternatively, in some instances, the remote system provides the entirety of the content item by generating image data representing the entirety of the content item and sending the image data to the electronic device.

In some instances, the user can cause the remote system to remove one or more topics from the list of topics. For instance, the electronic device may generate eighth audio data representing a fifth utterance from the user. The fifth utterance may include a request to remove the topic (described above) from the database. For example, a first portion of the fifth utterance may include a predefined word and/or phrase associated with remoting topics from the list of topics, such as, but not limited to, "Stop looking out for [topic]" or "Remove [topic] from list". A second portion of the fifth utterance may then include the topic that the user no longer desires for the remote system to search for related content. For example, and using the example above where the topic includes "Keanu Reeves," the second portion of the fifth utterance may include the phrase "Keanu Reeves." The electronic device can then send the eighth audio data to the remote system.

The remote system can receive the eighth audio data from the electronic device and, in response, perform speech recognition on the eighth audio data to identify the fifth utterance. The remote system can then identify the intent of the fifth utterance. For instance, the remote system can determine that the first portion of the fifth utterance includes the predefined word and/or phrase, such as "Stop looking out for" or "Remote from list". This predefined word and/or phrase may indicate to the remote system that the next portion of the fifth utterance includes the topic that the user wants removed from the list of topics. For instance, after identifying the predefined phrase and/or phrase, the remote system can identify the second portion of the fifth utterance, which may include the topic. The remote system can then remove (e.g., delete) the topic data associated with the topic from the database. By removing the topic data from the database, the remote system may no longer search for content items associated with the topic.

In some instances, when storing one or more respective topics and/or content items associated with the one or more respective topics for each user profile, and before providing the content items to a user, the remote system may initially determine the identity of the user that is requesting the content items. For example, the remote system may analyze the second audio data (described above) using voice recognition to identify the user that provided the second utterance, and then identify the user profile that is associated with the user. For another example, the remote system may receive data from the electronic device that identifies the user providing the second utterance, and then identify the user profile that is associated with the user. In either example, the remote system may utilize the user profile to determine which content items to provide to the electronic device. For instance, the remote system may identify content items stored in the database that are relevant to the one or more topics associated with the user profile. The remote system may then send the electronic device at least a portion of the identified content items, using similar techniques as described above.

It should be noted that, although the above description includes the remote system performing each of the processes based on receiving audio data from the electronic devices, in some instances, the remote system may perform similar processes based on receiving other types of data from the electronic device. For instance, the remote system may receive messages from the electronic device that include text. The text may include any of the predefined words and/or phrases described above. The remote system can then analyze the text to determine the intent of the user and, based on the intent, perform similar processes as those described above (e.g., store data associated with a topic, identify content based on receiving a request, send the content to the electronic device, etc.).

FIG. 1 is an example process 100 for adding a topic to a list of topics, and then retrieving content related to the topic. At 102, the process 100 receives first audio data representing a first utterance. For instance, an electronic device 106 may generate first audio data representing a first utterance 104 from a user 108. In the example process 100, the first utterance includes "Lookout for "topic"." As discussed above, the topic can include people, places, movies, music, weather, politics, automobiles, and/or the like. The electronic device 106 can then send the first audio data to a remote system (which is illustrated in FIGS. 2A-2D).

At 110, the process 100 stores data representing the topic from the first utterance in a database. For instance, the remote system may perform speech recognition on the first audio data in order to generate first text data representing the first audio data. The remote system can then analyze the first text data to determine intent data associated with the first utterance 104. For instance, the remote system can determine that the intent data associated with the first utterance 104 is to add the topic to a list of topics that is associated with a user profile of the user 108. In response, the remote system can store data representing the topic (represented by topic data 112) in a database 114. In some instances, the database 114 includes a user database 114 that stores data associated with user profiles.

At 116, the process 100 receives second audio data representing a second utterance. For instance, after storing the topic data 112 in the database 114, the electronic device 106 may generate second audio data representing a second utterance 118 from the user 108. In the example process 100, the second utterance includes "What's on my list.". In some instances, the phrase "What's on my list" can correspond to a request from the user 106 for content related to each topic that is include in the list of topics associated with the user profile. The electronic device 106 can then send the second audio data to the remote system.

At 120, the process 100 sends content associated with the topic. For instance, the remote system may perform speech recognition on the second audio data in order to generate second text data representing the second audio data. The remote system can then analyze the second text data to determine intent data associated with the second utterance 118. For instance, the remote system can determine that the intent data associated with the second utterance 118 is to receive content related to each topic that is included in the list of topics. In response, the remote system can perform a search for content related to each topic that is included in the list of topics, including the topic received at 102, and send the content to the electronic device 106 (which is described in detail below). The electronic device 106 can receive the content from the remote system and output audio 122 related to the content to the user 108.

FIG. 2A is a schematic diagram of an example architecture 200 that includes a remote system 202 analyzing audio data 204 in order to add one or more topics to a list of topics 280 for a user 206. For instance, the user 206, located within an environment 208 (which may be remote from the remote system 202), may desire to receive content associated with one or more topics. As described above, topics can include people, places, movies, music, weather, politics, automobiles, and/or the like. To receive content associated with a topic, the user 206 can use an electronic device 210 to send audio data 204 to the remote system 202 via a network 212. For instance, the electronic device 210 may generate the audio data 204 representing an utterance 214 (e.g., user speech) from the user 206. In some instances, a first portion of the utterance 214 may include to a predefined word and/or phrase indicating that the user 206 is going to provide a topic to the remote system 202. For example, and without limitation, the first portion of the utterance 214 may include a predefined phrase such as "lookout for" and/or "add this to my list." Additionally, a second portion of the utterance 214 may include to a word and/or phrase corresponding to the topic that the user 206 desires the remote system 202 to retrieve content. For example, the second portion of the utterance 214 may include the phrase "Keanu Reeves" (e.g., the topic). The electronic device 210 can then send the audio data 204 to the remote system 202 for analysis.

The remote system 202, which comprises one or more network resources or devices 216, may receive the audio data 204 from the electronic device 210. In response, the remote system 202 can utilize the speech-recognition component 218 to perform speech recognition on the audio data 204 to generate text data representing the audio data 204. The speech-recognition component 218 can then analyze the text data to identify intent data associated with the utterance 214. For instance, based on analyzing the text data, the speech-recognition component 218 can determine that the first portion of the utterance 214 (e.g., a first portion of the text) includes the predefined word and/or phrase, such as "lookout for" and/or "add this to my list." This predefined word and/or phrase may indicate to the speech-recognition component 218 that the next portion of the utterance 214 includes the topic for which the user 206 desires content. For instance, after identifying the predefined phrase and/or phrase, the speech-recognition component 218 can identify the second portion of the utterance 214 (e.g., second portion of the text), which may include the topic for which the user 206 desires content. For example, and continuing with the example above, the second portion of the utterance 214 may include the topic "Keanu Reeves."

Based on determining that the intent of the audio data 204 is associated with storing the topic, the speech-recognition component 218 send the audio data 204 and/or the text data to a content component 220. The content component 220 can use the audio data 204 and/or the text data to generate data 222 for the topic. In some instances, the data 222 can include the text data represented by the audio data 204. In some instances, the data 222 can include a portion of the text data, such as the second portion of the text data that includes the topic (e.g., the portion of the utterance 214 that indicates the topic). Still, in some instances, the data 222 can include any other type of data that represents the topic identified within the utterance 214 by the remote system 202. The content component 220 can then store the data 222 with a user-profile component 224. For instance, the content component 220 can send the data 22 to the user-profile content 224, which can store the data 222 in a database associated with the user-profile component 224. Additionally, in some instances, the content component 220 may add an indication of the topic to a list of topics 280.

In some instances, before storing the data 222 with the user-profile component 224, content component 220 filters the data 222 to determine if the topic is valid. For instance, the content component 220 may send the data 222 to a filter component 226 to compare the topic to a list of topics 282, where the list of topics 282 indicates topics that are found to be invalid. Based on the comparison, the filter component 226 can determine if the topic is included in the list of topics 282. If the filter component 226 determines that the topic is not included in the list of topics 282, then the filter component 226 may determine that the topic is valid. However, if the filter component 226 determines that the topic is included in the list of topics 282, then the filter component 226 may determine that the topic is invalid Additionally, or alternatively, in some instances, the content component 220 may utilize the encryption/decryption component 228 to first encrypt the data 222 before storing the data 222 with the user-profile component 224. For instance, the encryption/decryption component 228 can retrieve one or more keys from the key database 230. The encryption/decryption component 228 can then utilize the one or more keys to encrypt the data 222. In some instances, the one or more keys are associated with the user 206 and/or the electronic device 210. For instance, the encryption/decryption component 228 may utilize the one or more keys to encrypt/decrypt data that is generated for the user 206. In some instances, the one or more keys are associated with the data 222. For instance, the encryption/decryption component 228 may utilize the one or more keys to encrypt/decrypt the data 222. The content component 220 can then store the encrypted data 222 with the user-profile component 224.

Additionally, or alternatively, in some instances, the content component 220 may associate the data 222 with a user profile associated with the user 206 that provided the utterance 214. For example, the content component 220 may utilize the user-identification component 232 to identify the user 206. In some instances, the user-identification component 232 identifies the user 206 using data received from the electronic device 210. For instance, the data may include audio data representing an utterance from the user 206, where the utterance includes the identity (e.g., name, username, etc.) of the user 206. Additionally, or alternatively, in some instances, the user-identification component 232 may identify the user 206 by processing the audio data 204 using speech recognition and/or voice recognition. For instance, the user-identification component 232 may analyze the audio data 204 using one or more algorithms associated with voice recognition, where the one or more algorithms may match the audio data 204 to audio data representing the user's 206 voice that is stored by the remote system 202. Based on the match, the user-identification component 232 may identify the user 206. In either example, after identifying the user 206, the content component 220 can store data that associates the data 222 (which may be encrypted) with the user profile with the user-profile component 224, which may also be represented by 222.

In some instances, the remote system 202 may perform similar processes in order to generate data 222 associated with one or more additional topics. For instance, the remote system 202 may continue to receive audio data 204 representing utterance(s) 214 from the user 206. In response, the remote system 202 may analyze the audio data 204 to identify one or more topics that the user 206 desires the remote system 202 to utilize when searching for content. The remote system 202 can then utilize the processes above (e.g., filtering, encrypting, user identification, etc.) to generate and store data 222 for respective identified topics. In some instances, the remote system 202 may set a limit on the number of topics that the user 206 can store with the user-profile component 224 an/or add to the list of topics 280. For example, the remote system 202 may limit the number of topics to five topics, ten topics, one hundred topics, and/or the like. In some instances, the remote system 202 may not limit the number of topics that the user can store with the user-profile component 224 and/or add to the list of topics 280. Additionally, in some instances, the remote system 202 then adds each topic to the list of topics 280 as the remote system 202 stores the data 222 associated with the topics for the user 206.

In some instances, the content component 220 can utilize an interaction component 234 to record each of the interactions between the user 206 and the remote system 202. For instance, each time the remote system 202 receives audio data 204 representing an utterance 214 from the electronic device 210, the interaction component 234 can store data 236 representing the interaction in an interactions database 238. In some instances, the data 236 stored in the interactions database 238 includes the received audio data 204. In some instances, the data 236 stored in the interactions database 238 can represent information describing the interaction. For instance, the data 236 can represent information describing that the interaction was to store the topic with the user-profile component 224 and/or information describing which topic was stored with the user-profile component 224.

In some instances, the user 206 can send a request to the remote system 202 for the list of topics that are stored with the user-profile component 224. For instance, the electronic device 210 may generate additional audio data 204 representing an additional utterance 214 (e.g., user speech) from the user 206. In some instances, the additional utterance 214 may include a predefined word and/or phrase indicating that the user 206 is requesting the list of topics from the remote system 202. For instance, the additional utterance 214 may include a predefined phrase such as, but not limited to, "What's on my lookout list" and/or "What topics are you currently searching". The electronic device 210 can then send the additional audio data 204 to the remote system 202 for analysis.

The remote system 202 may receive the additional audio data 204 from the electronic device 210. In response, the remote system 202 can utilize the speech-recognition component 218 to perform speech recognition on the additional audio data 204 to generate additional text data representing the additional data 204. Additionally, the speech-recognition component 218 can analyze the additional text data to determine that intent data associated with the additional utterance 214 is to request the list of topics. For instance, the speech-recognition component 218 can determine that the additional utterance 214 (e.g., the text data) includes the predefined word and/or phrase, such as "What's on my lookout list" and/or "What topics are you currently searching". Based on identifying the predefined word and/or phrase, the speech-recognition component 218 can send the additional audio data 204 and/or the additional text data to the content component 220, which can generate the list of topics for the user 206.

For instance, the content component 220 can communicate with the user-profile component 224 to identify data 222 that is associated with each of the topics and/or identify which topics are included in the list of topics 280. The content component 220 can then generate audio data that indicates each of the topics (e.g., the list of the topics). After generating the audio data, the remote system 202 can send the audio data to the electronic device 210. The electronic device 210 can receive the audio data from the remote system 202 and, in response, output audio represented by the audio data. For instance, the electronic device 210 can output audio that indicates each of the topics that are associated with the user profile of the user 206.

In some instances, each time the remote system 202 stores data 222 associated with a topic with the user-profile component 224, the remote system 202 can send the user 206 an indication that the data 222 associated with the topic was stored with the user-profile component 224 and/or that the topic was added to the list of topics. For example, the remote system 202 can utilize the content component 220 to generate audio data, where the audio data represents speech indicating that the topic has been added to the list of topics. The remote system 202 can then send the audio data to the electronic device 210. The electronic device 210 can receive the audio data from the remote system 202 and, in response, output audio represented by the audio data.

As also illustrated in the example of FIG. 2A, the remote system 202 includes a content database 240, a results database 242, processor(s) 244, network interface(s) 246, and memory(s) 248, which stores the speech-recognition component 218, the user-identification component 232, the content component 220, the filter component 226, the encryption/decryption component 228, the interaction component 234, a searching component 250, a query component 252, and a text-to-speech (TTS) engine 278. As used herein, processor(s) (e.g., processor(s) 244) may include multiple processors and/or a processor having multiple cores. Further, the processor(s) may comprise one or more cores of different types. For example, the processor(s) may include application processor units, graphic processing units, and so forth. In one implementation, the processor may comprise a microcontroller.

Additionally, memory (e.g., memory 248) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Furthermore, network interface(s) (e.g., network interface(s) 246) may include a personal area network (PAN) component to enable communications over one or more short-range wireless communication channels. For instance, the PAN component may enable communications compliant with at least one of the following standards IEEE 802.25.4 (ZigBee), IEEE 802.25.2 (Bluetooth), IEEE 802.22 (WiFi), or any other PAN communication protocol. Furthermore, network interface(s) may include a wide area network (WAN) component to enable communication over a wide area network.

Moreover, the network 212 may represent an array or wired networks, wireless networks (e.g., WiFi), or combinations thereof. The remote system 202 may generally refer to a network-accessible service—or "cloud-based service"—implemented as a computing infrastructure of processors, storage, software, data access, and so forth that is maintained and accessible via the network 212, such as the Internet. Common expressions associated with cloud-based services, such as the remote system 202, include "on-demand computing", "software as a service (SaaS)", "service computing", "network accessible service", and so forth.

Figure 2B:
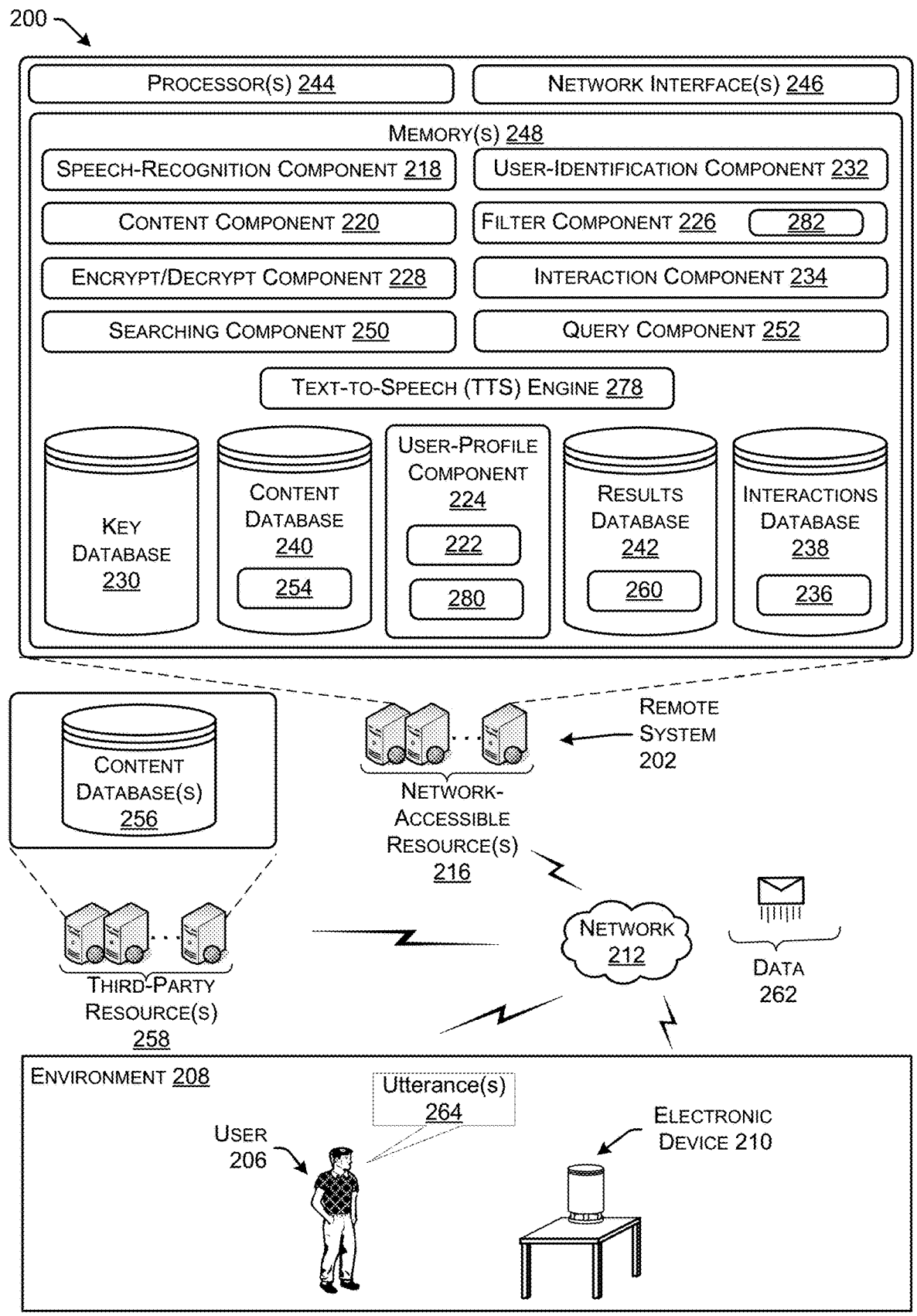
FIG. 2B is a schematic diagram of an example architecture that includes the remote system performing searches to identify content related to the one or more topics.

FIG. 2B is a schematic diagram of the example architecture 200 that now includes the remote system 202 performing searches using the data 222, and the user 206 requesting content related to the one or more topics. For instance, in some examples, after storing the data 222 associated with the one or more topics with the user-profile component 224, the remote system 202 can then proactively perform one or more searches for content related to the one or more topics. For instance, the remote system 202 (and/or the content component 220) can utilize the searching component 250 to perform one or more searches for content item(s) related to a topic. In some instances, the searching component 250 can search through content items 254 that are stored locally by the remote system 202 in the content database 240. For example, the content database 240 may store the content items 254, where the content items 254 include news, articles, books, music, videos, documents, information, and/or any other type of content items that can be identified during a search. Additionally, or alternatively, in some instances, the searching component 250 can search one or more content database(s) 256 (e.g., using an Internet search) stored on one or more third-party resource(s) 258. For example, the content database(s) 256 may store content items, such as news, articles, books, music, videos, documents, information, and/or any other type of content item that can be identified during a search. In some instances, at least a portion of the content items 254 stored in the content database 240 differ from at least a portion of the content items stored in the content database(s) 256.

In some instances, to identify a content item that is related to the topic, the searching component 250 can match the topic (e.g., the word and/or phrase represented by the data 222) to information included in the content item. For example, if the content item includes text, such as an article, the searching component 250 can match the topic to one or more words and/or phrases included within the content item. For a second example, if the content item includes music, the searching component 250 can match the topic to one or more words and/or phrases included in the lyrics, the title, the listing of artists, and/or the like of the music. Finally, for a third example, if the content item includes a movie and/or other type of video data, the searching component 250 can match the topic to information describing the movie, such as the title, characters, reviews, description, and/or the like. Although these are just examples of identifying content that is related to the topic, the searching component 250 can use any other techniques and/or processes to identify the content that is related to the topic.

The searching component 250 can then store identified content items 260 in a results database 242. In some instances, the searching component 250 can further store data indicating which content items 260 are related to which stored topics. For example, if the searching component 250 identifies a first content item 260 for a first topic and a second content item 260 for a second topic, the searching component 250 can store first data indicating that the first content item 260 is related to the first topic and second data indicating that the second content item 260 is related to the second topic. In some instances, the searching component 250 can further store data indicating a date and/or time that each content item 260 was created, identified, and/or stored in the results database 242. In some instances, the searching component 250 can further store data indicating a number of instances at which the topic is included within the content item 260. For example, and using the example above where the topic includes "Keanu Reeves", if a content item 260 includes the phrase "Keanu Reeves" twenty times, then the searching component 250 can store data in the results database 242 that indicates that the content item 260 includes twenty instances of the topic.

In some instances, the user 206 can request content associated with the topics. For instance, the electronic device 210 may generate audio data 262 representing an utterance 264 from the user 206. The utterance 264 can include a request for content items related to topics that are stored in associated with the user profile. In some instances, the request may be specific to a topic. For example, and using the example above where the topic includes "Keanu Reeves", the utterance 264 may include, but is not limited to, "Please provide me with content associated with Keanu Reeves" and/or "What did you find about Keanu Reeves". Additionally, or alternatively, in some instances, the request may be general to all of the topics that the remote system 202 has stored in association with the user profile. For example, the utterance 264 may include "What stories did you find", "What's on my lookout list", "What's up", or "What's trending". The electronic device 210 can then send the audio data 262 to the remote system 202.

The remote system 202 can receive the audio data 262 from the electronic device 210. In response, the remote system 202 can utilize the speech-recognition component 218 to perform speech recognition on the audio data 262 to generate text data representing the audio data 262. The speech-recognition component 218 can then analyze the text data to determine that intent data associated with the utterance 264 is to consume (e.g., listen to, view, receive, etc.) content items associated with one or more topics. For instance, if the request is specific to a topic, the speech-recognition component 218 can determine that a first portion of the utterance 264 (e.g., a first portion of the text data) includes a predefined word and/or phrase associated with retrieving content items that are related to a single topic. The predefined word and/or phrase can include, but is not limited to, "Please provide me with content associated with" and/or "What did you find about". The speech-recognition component 218 can then determine that a second portion of the utterance 264 (e.g., a second portion of the text data) indicates the topic for which the user 206 is requesting related content items, such as "Keanu Reeves" in the example. In some instances, the request can be specific to two or more topics. For instance, the second portion of the utterance 264 may indicate more than one topic at which the user 206 is requesting related content items. For example, the second portion of the utterance 264 may include "Keanu Reeves and Fast and the Furious".

Additionally, if the request includes a general request for content items related to topics stored with the user-profile component 224, the speech-recognition component 218 can determine that the utterance 264 includes a predefined word and/or phrase associated with retrieving content items that are related to all stored topics. For example, the predefined word and/or phrase can include, but is not limited to, "What stories did you find", "What's on my lookout list", "What's up", and/or "What's trending". In either of the examples above, the speech-recognition component 218 can then send the audio data 262 and/or the generated text data to the content component 220.

In some instances, the content component 220 utilizes the user-identification component 232 to identify which user 206 is request the content items. For example, the user-identification component 232 can analyze the audio data 262 using one or more algorithms associated with voice recognition, where the one or more algorithms may match the audio data 262 to the audio data representing the user's 206 voice (described above). Based on the match, the user-identification component 232 may identify the user 206. For another example, the user-identification component 232 identifies the user 206 using additional data received from the electronic device 210. For instance, the data may include audio data representing an utterance from the user 206, where the utterance includes the identity (e.g., name, username, etc.) of the user 206.

In some instances, the speech-recognition component 218 can utilize an interaction component 234 to again record each of the interactions between the user 206 and the remote system 202. For instance, the interaction component 234 may store the audio data 262 received from the electronic device 210 in the interactions database 238, which can be represented by data 236. Additionally, or alternatively, the interaction component 234 may store data 236 that represents information describing the interaction. For instance, the data 236 can represent information describing that the interaction was to request the content items associated with the one or more topics.

In some instances, in addition to or alternatively from proactively searching for content, the content component 220 may utilize the searching component 250 to search for the content in response to determining the intent of the audio data 262. For example, if the request is for content related to a topic, the content component 220 can determine the intent of the audio data 262 and then perform a search for content items 260 related to the topic (using similar processes as described above). For another example, if the request is for content related to more than one topic, such as all of the topics that are included in the list of topics 280 associated with the user profile, the content component 220 can determine the intent of the audio data 262 and then perform a search for content items 260 that are related to each of the topics.

It should be noted that, in some instances, before receiving the audio data 262 representing the utterance 264 that includes the request for the content items, the remote system 202 may send a query to the user 206 regarding whether to send the content items 260 to the user. For instance, the remote system 202 may determine that the user 206 is proximate to the electronic device 210. In some instances, the remote system 202 makes the determination based on receiving data from the electronic device 210, which may also be represented by 262. For example, the electronic device 210 may include an image sensor that captures image data depicting the user 206. The electronic device 210 can then analyze the image data to determine that the user 206 is proximate to the electronic device 210 and, in response, send the data to the remote system 202. For a second example, the electronic device 210 may include a motion sensor that detects motion proximate to the electronic device 210. The electronic device 210 can then send data to the remote system 202 that indicates that the electronic device 210 detected the motion.

For a third example, the electronic device 210 may generate audio data representing an utterance 264 of the user 206, which can also be represented by 262. The utterance 264 may include a request for content other than the content items 262 related to the one or more topics. In response, the electronic device 210 can send the audio data to the remote system 202. The remote system 202 can then utilize the speech-recognition component 218 to perform speech recognition on the audio data to identify the utterance 264 (e.g., generate text data corresponding to the utterance 264). Additionally, the remote system 202 can determine that an intent of the utterance 264 and generate a response for the user 206. Furthermore, the remote system 202 can determine that the content items 260 related to the one or more topics associated with the user profile are stored in the results database 242. Based on the determination, the remote system 202 can utilize the query component 252 to generate a query for the user 206. The query can include a question asking if the user 206 would like the remote system 202 to provide the content items 260. The remote system 202 can then generate and send audio data back to the electronic device 210 that includes the response to the utterance 264 and the query.

The electronic device 210 can receive the audio data from the remote system 202 and, in response, output the query to the user 206. The user 206 may then decide whether he or she wants the remote system 202 to provide the content items 260. If the user 206 decides that he or she wants the remote system 202 to provide the content items 260, the electronic device 210 may receive the utterance 264 described above that includes the request for the content items 260.

Figure 2C:
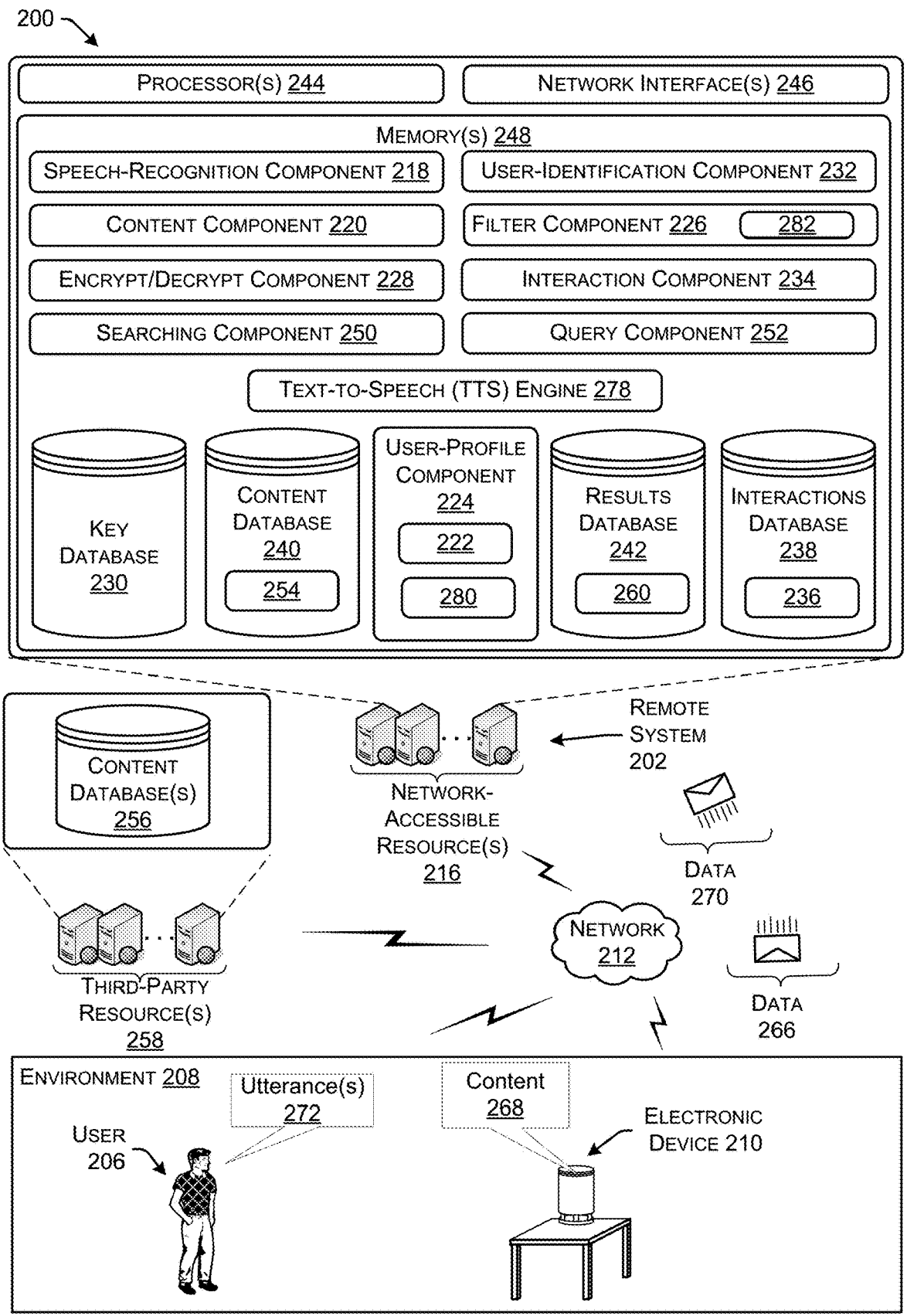
FIG. 2C is a schematic diagram of an example architecture that includes the remote system proving the user with content.

FIG. 2C is a schematic diagram of an example the architecture 200 that now includes the remote system 202 proving the user 206 with content. For instance, based on determining that the utterance 264 (from FIG. 2B) includes a request for the content items 260, and/or based on determining the identity of the user provide of the user 206 that provided the utterance 264, the remote system 202 (and/or the content component 220) can utilize the searching component 250 to retrieve and provide the content items 260 to the user 206. In some instances, when the request includes content related to a specific topic (and/or one or more topics), the searching component 250 may retrieve the content items 260 that are related to the specific topic. In some instances, when the request includes a general request for content items 260 related to all of the topics that are associated with the user profile, the searching component 250 may retrieve the content items 260 that are related all of the topics.

In some instances, before providing the content items 260 to the user 206, the searching component 250 first orders the content items using one or more factors. For instance, the searching component 250 may order the content items 260 based on recency of the content items 260. For instance, the searching component 250 can order the content items 260 such that the first content item 260 provided to the user 206 is the most recent content item 260 (e.g., the newest content item), the second content item 260 provided to the user 206 is the second most recent content item 260, the third content item 260 provided to the user is the third most recent content item 260, and so on. In some instances, when organizing content items based on recency, the searching component 250 can analyze each content item to determine a date (e.g., day, time, etc.) associated with the content item. The searching component 250 can then use the dates of the respective content items 260 to order the content items.

Additionally, or alternatively, the searching component 250 may order the content items 260 based on a how relevant each content item 260 is to its respective related topic. For example, the searching component 250 may determine a respective correlation score for each content item 260. The correlation score for a content item 260 can indicate how relevant the content item 260 is to the related topic. In some instances, the searching component 250 determines the correlation score based on the number of times that the topic is included (e.g., recited, spoken, referred to, etc.) within the content item 260. For instance, a first content item 260 that includes ten instances of one or more words and/or phrases matching the topic may include a greater correlation score than a second content item 260 that includes two instances of one or more words and/or phrases matching the topic. The searching component 250 can then order the content items 260 such that the mort relevant content item 260 (e.g., the content item 260 with the highest correlation score) is provided first to the user 206, the second most relevant content item 260 (e.g., the content item 260 with the second highest correlation score) is provided second to the user 206, the third most relevant content item 260 (e.g., the content item 260 with the third highest correlation score) is provided third to the user 206, and so on.

For example, the searching component 250 can determine a first number of times that the topic is included in a first content item 260. Using the first number of times, the searching component 250 can determine a first correlation score for the first content item 260. The searching component 250 can then determine a second number of times that the topic is included in a second content item 260. Using the second number of times, the searching component 250 can determine a second correlation score for the second content item 260. The searching component 250 can then determine an order for the first content item 260 and the second content item 260 using the first correlation score and the second correlation score. For instance, if the first correlation score is higher than the second correlation score, such that the first number of times is greater than the second number of times, the searching component 250 can determine that the order includes the first content item 260 followed by the second content item 260.

In some items, the searching component 250 may order the content items 260 based on which topics the content items 260 are related to. For example, remote system 202 may store data indicating that content items 260 related to a first topic are to be provided before content items 260 related to a second topic. In some instances, the remote system 202 stores the data based on receiving a message from the electronic device 210 that indicates the order. Using the data, the searching component 250 can thus order stored content items 260 that are related to the first topic and the second topic such that all of the content items 260 related to the first topic are provided to the user 206 before all of the content items 260 that are related to the second topic.

In some instances, the searching component 250 may further limit the number of content items 260 that are provided to the user 206. For example, and without limitation, the searching component 250 may limit the number of content items 260 to five content items 260, ten content items 260, fifty content item 260, one hundred contents 260, and/or the like. In some instances, when limiting the number of content items 260, the searching component 250 may utilize the determined order for the content items 260. For example, if the searching component 250 limits the number of content items 260 to ten content items 260, then the searching component 250 can provide the user 206 with the first ten content items 260 in the ordered list. Additionally, or alternatively, in some instances, when limiting the number of content items 260, the searching component 250 may limit the number of content items 260 that are related to each topic. For example, and again if searching component 250 is limiting the number of content items 260 to ten content items 260, if the searching component 250 identified content items 260 related to five different topics, then the searching component 250 may provide the user 206 with a respective two content items 260 for each of the five topics.

In some instances, in addition to, or alternatively from providing the user 206 with the content items 260, the searching component 250 may provide the user 206 with information (e.g., portions of the content items 260) related to the content item 260. For example, if a content item 260 includes text, such as a news article, the information related the content item 260 can include the title, the author, a portion of content (e.g., the introduction, the summary, the first paragraph, etc.), the rating, and/or the like of the content item 260. For a second example, if a content item 260 includes music, the information related to the content item 260 can include the title, the artist, a portion of the content (e.g., a portion of the lyrics, a sound clip, etc.), the rating, and/or the like of the content item 260. For a third example, if a content item 260 includes a video, such as a movie, the information related the content item 260 can include the title, the actors, a portion of content (e.g., a clip from the movie), the trailer, and/or the like of the content item 260. In some instances, by providing the information (e.g., a portion of the content item 260) rather than the entire content item 260, the user 206 can quickly consume each of the provided content items 260 (described in detail below).

The remote system 202 can then utilize the content component 220 to provide the content items 260 to the user 206 using various techniques. In some instances, the remote system 202 can send the content items 260 (and/or the information related to the content items 260) to the electronic device 210, which is represented by data 266. For example, if a content item 260 includes music, the remote system 202 can send the electronic device 210 audio data representing the music. For a second example, if the content item 260 includes text, the remote system 202 can send the electronic device 210 data representing the text. Finally, for a third example, if the content items 260 each include text, such as news articles, the remote system 202 can send the electronic device 210 information related to each of the content items 260 (e.g., a respective portion, such as the respective title, of each of the content items 260).

Additionally, or alternatively, in some instances, the remote system 202 may first utilize the TTS engine 278 to generate audio data representing the content items 260 and then send the audio data to the electronic device 210. For example, the TTS engine 278 can process the content items 260 by converting the content items 260 from text-to-speech (described below). The TTS engine 278 can then generate audio data representing the speech, which the remote system 202 can send to the electronic device 210, which may also be represented by data 266. For another example, the TTS engine 278 can process the information related to the content items 260 by converting the information from text-to-speech. The TTS engine 278 can then generate audio data representing the speech, which the remote system 202 can send to the electronic device 210, which may also be represented by data 266. In some instances, the remote system 202 may use such a technique to send the content items 260 and/or information related to the content items 260 when the electronic device 210 does not include a display.

The electronic device 210 can receive the data 266 from the remote system 202 and, in response, output content 268 represented by the data 266. For example, if the data 268 includes audio data representing the content items 260, the electronic device 210 can output audio representing the content items 260 and/or information related to the content items 260. For another example, if the data 266 includes image data representing the content items 260 and the electronic device 210 includes a display, the electronic device 210 can display the image data representing the content items 260 using the display.

In some instances, such as when the data 266 represents information related to the content items 260 (e.g., a respective portion of each of the content items 260), the user 206 may select one or more content items 260. The remote system 202 may then send the user 206 an entirety of the selected content items 260. For example, the electronic device 210 may generate audio data 270 representing an utterance 272 of the user 206. The utterance 272 may include a request to receive the entirety of one of the content items 260 provided by the remote system 202. For instance, if the remote system 202 provided the user 206 with a portion of the content item 260, such as the title and/or introduction from the content item 260, the request may be for the remainder of the content item 260. The electronic device 210 can then send the audio data 270 to the remote system 202.

The remote system 202 can receive the audio data 270 from the electronic device 210. In response, the remote system 202 can utilize the speech-recognition component 218 to perform speech recognition on the audio data 270 to generate text data representing the audio data 270. The speech-recognition component 218 can then analyze the text data to identify that the text data (which represents the utterance 272) includes a request for the content item 260. For example, the speech-recognition component 218 may determine that a first portion of the utterance 272 (e.g., a first portion of the text data) includes a predefined word and/or phrase associated with requesting content items 260, such as, but not limited to, "Please provide me with" and/or "I would like to receive." Based on the first portion of the utterance 272 including the predefined word and/or phrase, the speech-recognition component 218 can determine that a second portion of the utterance 272 (e.g., second portion of the text data) indicates the content item 260 being requested by the user 206. For example, if the user 206 is requesting a news article titled "Keanu Reeves Best Movies," then the speech-recognition component 218 may determine that the second portion of the utterance 272 includes "Keanu Reeves Best Movies."

After identifying the intent of the utterance 272 represented by the audio data 270, the speech-recognition component 218 can send the audio data 270 and/or the text data to the content component 220. The content component 220 can then utilize the searching component 250 to retrieve the content item 260 from the results database 242. The remote system 202 can then send the content item 260 to the electronic device 210, which may also be represented by data 266. In some instances, the TTS engine 278 may first process the content item 260 by converting the content item 260 from text-to-speech (described below). The TTS engine 278 can then generate audio data representing the speech, which the remote system 202 can send to the electronic device 210. In some instances, the TTS engine 278 may generate the audio data when the electronic device 210 does not include a display.

In some instances, the content component 220 can utilize the interaction component 234 to again record each of the interactions between the user 206 and the remote system 202. For instance, the interaction component 234 may store the audio data 266 sent to the electronic device 210 and/or the audio data 270 received from the electronic device 210 in the interactions database 238, which can be represented by data 236. Additionally, or alternatively, the interaction component 234 may store data 236 that represents information describing the interactions. For instance, the data 236 can represent information describing that the interaction was to request an entirety of the content item 260 stored in the results database 242.

Figure 2D:
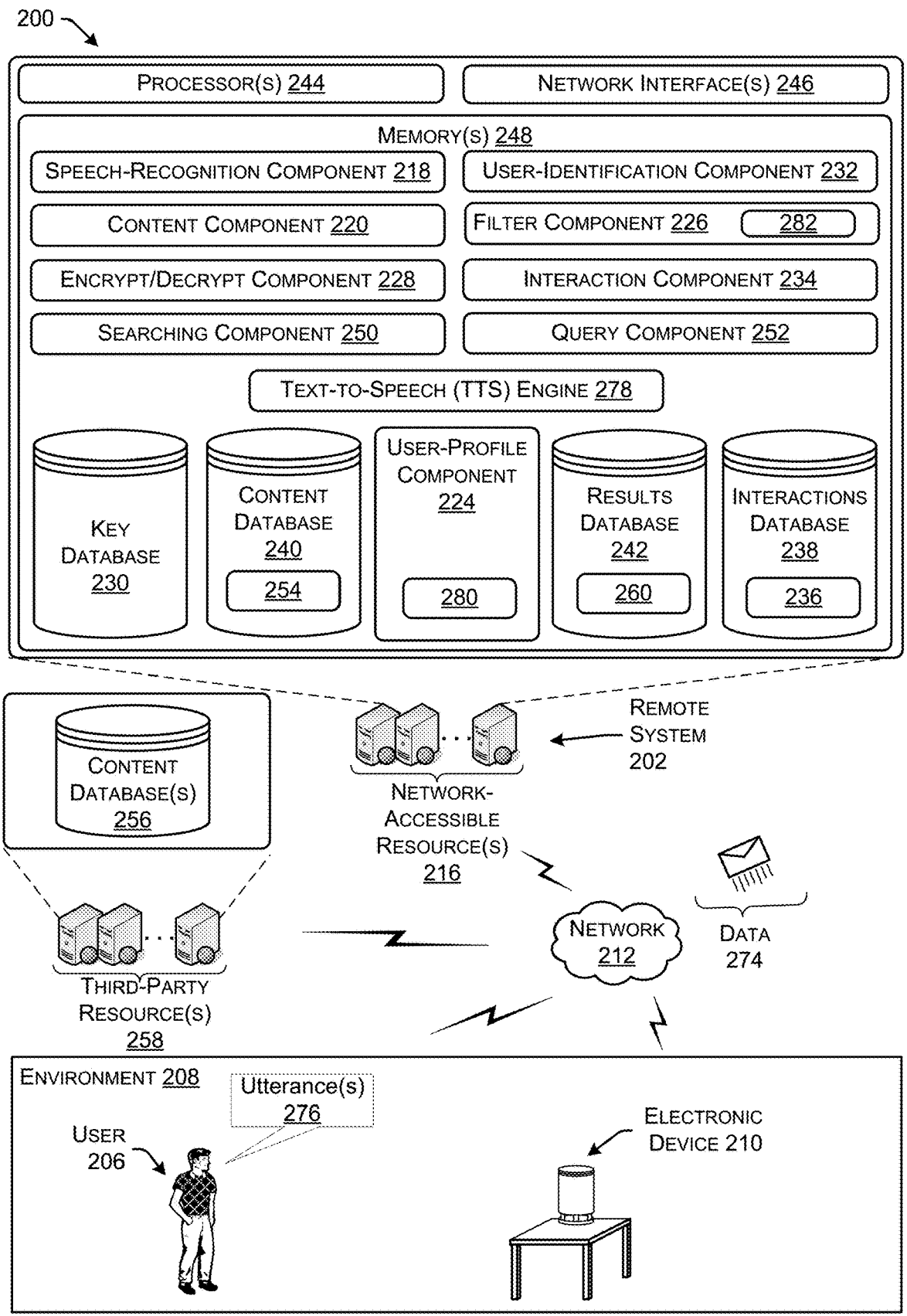
FIG. 2D is a schematic diagram of an example architecture that includes the remote system analyzing audio data in order to remove one or more topics stored in a database.

FIG. 2D is a schematic diagram of an example architecture that includes the remote system 202 analyzing audio data in order to remove data 222 related to one or more topics that are stored with the user-profile component 224. For instance, the user 206 can cause the remote system 202 to remove one or more stored topics from the list of topics 280 that is associated with the user profile. For example, the electronic device 210 may generate audio data 274 representing an utterance 276 from the user 206. The utterance 276 may include a request to remove a topic from the list of topics 280. For instance, a first portion of the utterance 276 may include a predefined word and/or phrase associated with remoting topics from the list of topics 280. For example, the predefined word and/or phrase may include, but is not limited to, "Stop looking out for" and/or "Remote from list". A second portion of the utterance 276 may then include the topic that the user wants removed from the list of topics 280. For example, and using the example above where the topic includes "Keanu Reeves," the second portion of the utterance 276 may include the phrase "Keanu Reeves." The electronic device 210 can then send the audio data to 274 to the remote system 202.

The remote system 202 can utilize the speech-recognition component 218 to perform speech recognition on the audio data 274 to generate text data representing the audio data 274. The speech-recognition component 218 can then analyze the text data to determine that intent data associated with the utterance 276 is to remove the topic from the list of topics 280. For instance, the speech-recognition component 218 can determine that the first portion of the utterance 276 (e.g., first portion of the text data) includes the predefined word and/or phrase associated with removing topics from the list of topics 280, such as "Stop looking out for" and/or "Remote from list". This predefined word and/or phrase may indicate to the speech-recognition component 218 that the next portion of the utterance 276 indicates the topic to be removed. For instance, after identifying the predefined phrase and/or phrase, the speech-recognition component 218 can identify the second portion of the utterance 276 (e.g., second portion of the text data), which may include the topic. For example, and again using the example where the topic includes Keanu Reeves", the speech-recognition component 218 can determine that the second portion of the utterance 276 includes "Keanu Reeves." The speech-recognition component 218 can then send the audio data 274 and/or the text data to the content component 220.

The content component 220 may then cause the user-profile component 224 to remove the data 222 associated with the topic, which is represented in the example of FIG. 2D. In some instances, removing the data 222 can include the user-profile component 224 deleting the data 222 from a database. Additionally, or alternatively, removing the topic can include removing the topic from the list of topics 280 associated with the user profile. In some instances, the remote system 202 can then send the user 206 an indication that the remote system 202 is no longer searching for content related to the removed topic. For example, the remote system 202 can utilize the content component 220 to generate audio data, where the audio data represents speech indicating that the topic has been removed from the list of topics 280. The remote system 202 can then send the audio data to the electronic device 220. The electronic device 220 can receive the audio data from the remote system 202 and, in response, output audio represented by the audio data.

In some instances, the content component 220 may further utilize the interaction component 234 to record the interactions between the user 206 and the remote system 202. For instance, the interaction component 234 can store data 236 representing the interaction of removing the topic in the interactions database 238. In some instances, the data 236 stored in the interactions database 238 includes the received audio data 274. In some instances, the data 236 stored in the interactions database 238 can represent information describing the interaction. For instance, the data 236 can represent information describing that the interaction was to remove the data 222 and/or information describing which topic was removed from the list of topics 280.

Figure 3:
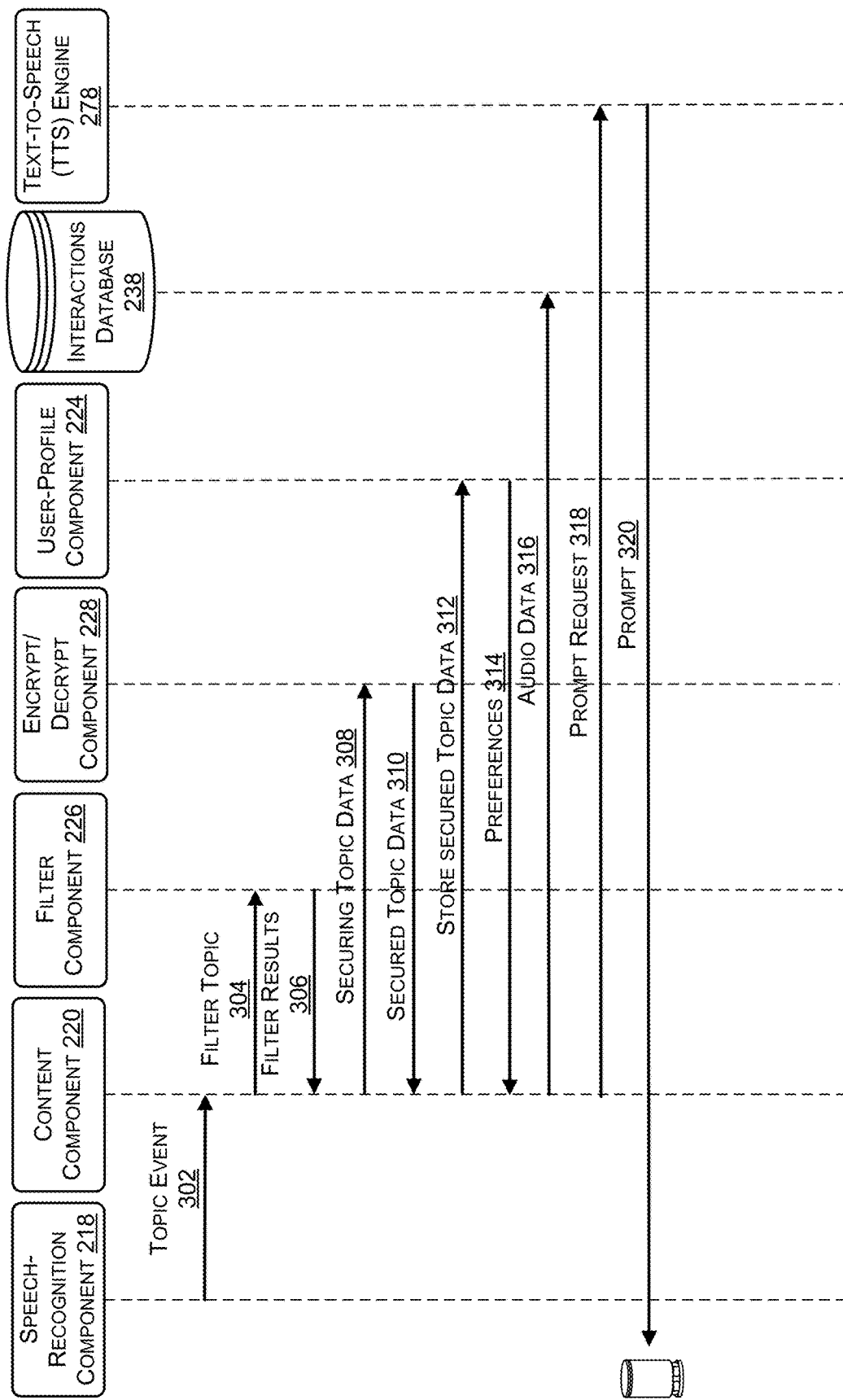
FIG. 3 is a schematic diagram of an example process of adding a topic to a list of topics.

FIG. 3 is a schematic diagram of an example process of adding a topic to a list of topics. For instance, at 302, the content component 220 receives a topic event from the speech-recognition component 218. For example, the speech-recognition component 218 may analyze audio data representing an utterance from a user, where the utterance includes a request to search for content related to a topic. In response, the content component 220 can receive an indication from the speech-recognition component 218 regarding the topic event, where the topic event is associated with identifying content related to the topic.

At 304, the content component 220 can send a request to the filter component 226 to filter the topic and at 306, the content component 220 can receive results from the filter component 226. For example, the content component 220 can send the request to the filter component 226 to determine whether the topic associated with the topic event is valid. The filter component 226 can then compare the topic to a list of topics that are labeled as invalid for various reasons. If the topic is included in the list of topics, then the filter results may indicate that the topic is invalid. However, if the topic is not included in the list of topics, then the filter results may indicate that the topic if valid. In some instances, the filter results may include a Boolean value. For example, and without limitation, the filter results may include 1 for valid and 0 for invalid.

At 308, the content component 220 can send a request to the encryption/decryption component 228 to secure the topic data 222 and at 310, the content component 220 can receive the secured topic data 222 from the encryption/decryption component 228. For example, based on receiving the request from the content component 220, the encryption/decryption component 228 can encrypt the topic data 222 using one or more keys. The encryption/decryption component 228 can then send the encrypted topic data 222 back to the content component 220.

At 312, the content component 220 can store the secured topic with the user-profile component 224 and at 314, the content component 220 can receive preferences form the user-profile component 224. For example, the content component 220 can send the encrypted topic data 222 to the user-profile component 224. In response, the user-profile component 224 can store the encrypted topic data 224 in a database. The user-profile component 224 can then send preferences back to the content component 220 that indicate that the encrypted topic data 222 has been stored in association with a user profile.

At 316, the content component 220 stores the audio data in the interaction database 238. For example, the content component 220 may store the audio data that included the request to add the topic to the list of topics to the interactions database 238.

At 318, the content component 220 can send a request to generate a prompt for the user to the TTS engine 278 and at 320, the TTS engine can generate and output the prompt. For example, the TTS engine 378 can generate audio data representing speech that indicates that the topic has been added to the list of topics associated with the user profile. The TTS engine 378 can then cause the remote system 202 to send the audio data to the electronic device 210.

Figure 4:
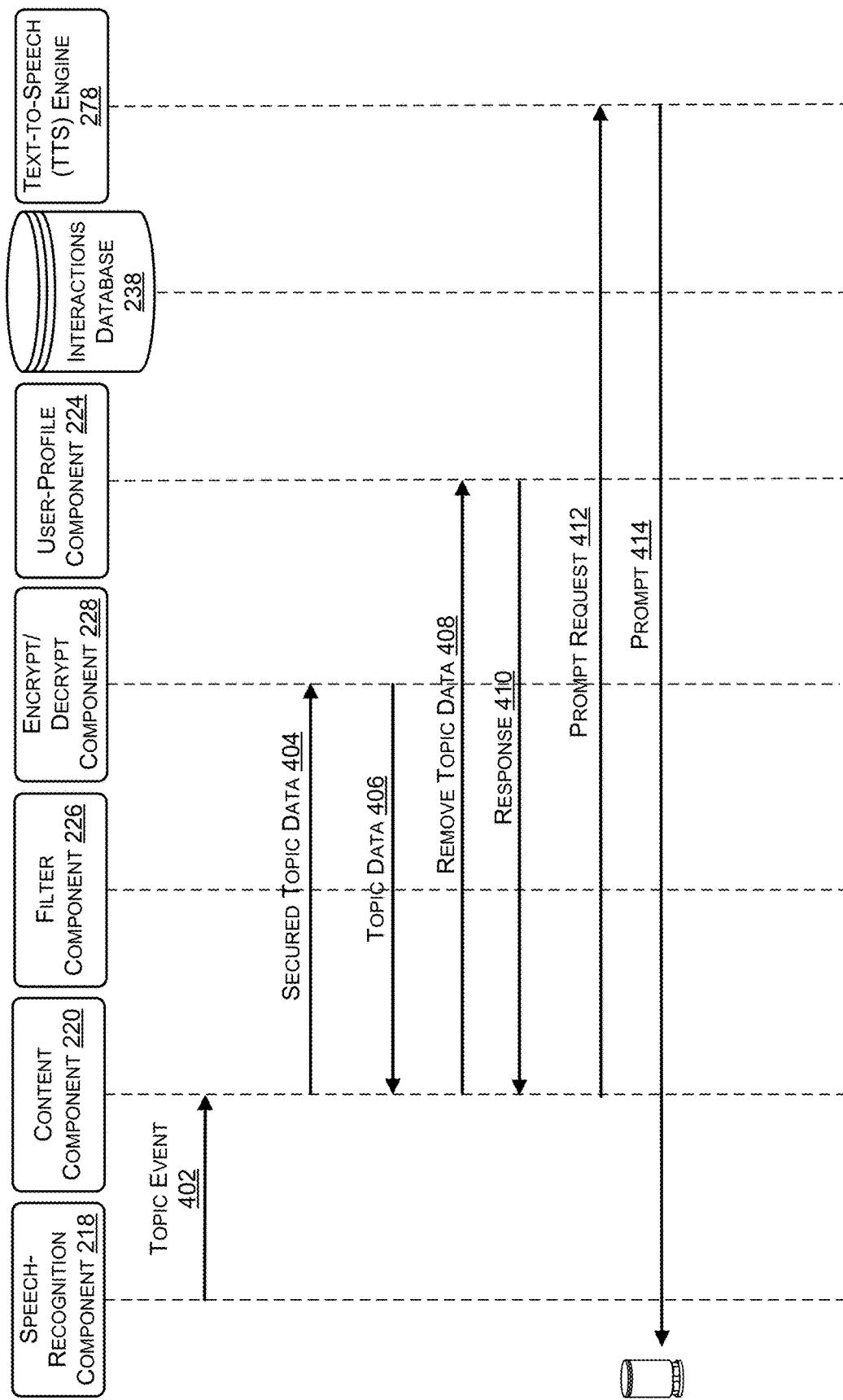
FIG. 4 is a schematic diagram of an example process of removing a topic from a list of topics.

FIG. 4 is a schematic diagram of an example process of removing a topic from a list of topics. For instance, at 402, the content component 220 receives a topic event from the speech-recognition component 218. For example, the speech-recognition component 218 may analyze audio data representing an utterance from a user, where the utterance includes a request to remove a topic from the list of topics (e.g., stop searching for content related to the topic). In response, the content component 220 can receive an indication from the speech-recognition component 218 regarding the topic event, where the topic event is associated with removing the topic from the list of topics.

At 404, the content component 220 sends secured topic data 222 to the encrypt/decrypt component 228 and at 406, the content component 220 receives the content data 222. At 408, the content component 220 sends a request to remove the top data 222 to the user-profile component 224 and at 410, the content component 220 receives a response indicating that the topic data 222 has been removed. For instance, the response may indicate that the topic has been removed from the list of topics that are associated with the user profile.

At 412, the content component 220 can send a request to generate a prompt for the user to the TTS engine 278 and at 414, the TTS engine can generate and output the prompt. For example, the TTS engine 378 can generate audio data representing speech that indicates that the topic has been removed from the list of topics associated with the user profile. The TTS engine 378 can then cause the remote system 202 to send the audio data to the electronic device 210.

FIG. 5 is a schematic diagram of an example process for retrieving content related to a topic. For instance, at 502, the content component 220 receives a topic event from the speech-recognition component 218. For example, the speech-recognition component 218 may analyze audio data representing an utterance from a user, where the utterance includes a request for content related to a topic. In response, the content component 220 can receive an indication from the speech-recognition component 218 regarding the topic event, where the topic event is associated with the request for the content.

At 504, the content component 220 send a query for topics to the user-profile component 224 and at 506, the content component 220 receives at least secured topic data 222. For example, based on receiving the request for the content, the content component 220 may retrieve data 222 associated with at least one topic from the user-profile component 224. In some instances, the topic data 222 is encrypted.

At 508, the content component 220 sends the secured topic data 222 to the encryption/decryption component 228 and at 510, the content component 220 receives the topic data 222 from the encryption/decryption component 228. For example, the encryption/decryption component 228 may receive the secured topic data 222 from the content component 220. In response, the encryption/decryption component 228 may retrieve the one or more keys that were used to encrypt the topic data 222 from the key database. The encryption/decryption component 228 can then use the one or more keys to decrypt the secured topic data 222. After decrypting, the encryption/decryption component 228 can send the topic data 222 back to the content component 220.

At 512, the content component 220 sends the topic data 222 to the searching component 250 and at 514, the content component 220 receives content related to the topic from the searching component 250. For example, the searching component 250 may receive the topic data 222 from the content component 220 and, in response, perform one or more searches to identify content related to the topic. The searching component 250 can then send the content related to the topic back to the content component 220.

At 516, the content component 220 can send a request to generate a prompt for the user to the TTS engine 278 and at 518, the TTS engine can generate and output the prompt. For example, the TTS engine 378 can generate audio data representing the content that is related to the topic (using the processes described herein). The TTS engine 378 can then cause the remote system 202 to send the audio data to the electronic device 210.

FIG. 6 is a schematic diagram of an example process for retrieving a list of topics. For instance, at 602, the content component 220 receives a topic event from the speech-recognition component 218. For example, the speech-recognition component 218 may analyze audio data representing an utterance from a user, where the utterance includes a request for topics included in a list of topics. In response, the content component 220 can receive an indication from the speech-recognition component 218 regarding the topic event, where the topic event is associated with the request for the list of entities.

At 604, the content component 220 send a query for topics to the user-profile component 224 and at 606, the content component 220 receives at least secured topic data 222. For example, based on receiving the request for the list of contents, the content component 220 may retrieve topic data 222 associated with at least one topic from the user-profile component 224. In some instances, the topic data 222 is encrypted.

At 608, the content component 220 sends the secured topic data 222 to the encryption/decryption component 228 and at 610, the content component 220 receives the topic data 222 from the encryption/decryption component 228. For example, the encryption/decryption component 228 may receive the secured topic data 222 from the content component 220. In response, the encryption/decryption component 228 may retrieve the one or more keys that were used to encrypt the topic data 222 from the key database. The encryption/decryption component 228 can then use the one or more keys to decrypt the secured topic data 222. After decrypting, the encryption/decryption component 228 can send the topic data 222 back to the content component 220.

At 612, the content component 220 can send a request to generate a prompt for the user to the TTS engine 278 and at 614, the TTS engine can generate and output the prompt. For example, the TTS engine 378 can generate audio data representing the list of entities. The TTS engine 378 can then cause the remote system 202 to send the audio data to the electronic device 210.

Figure 7A:
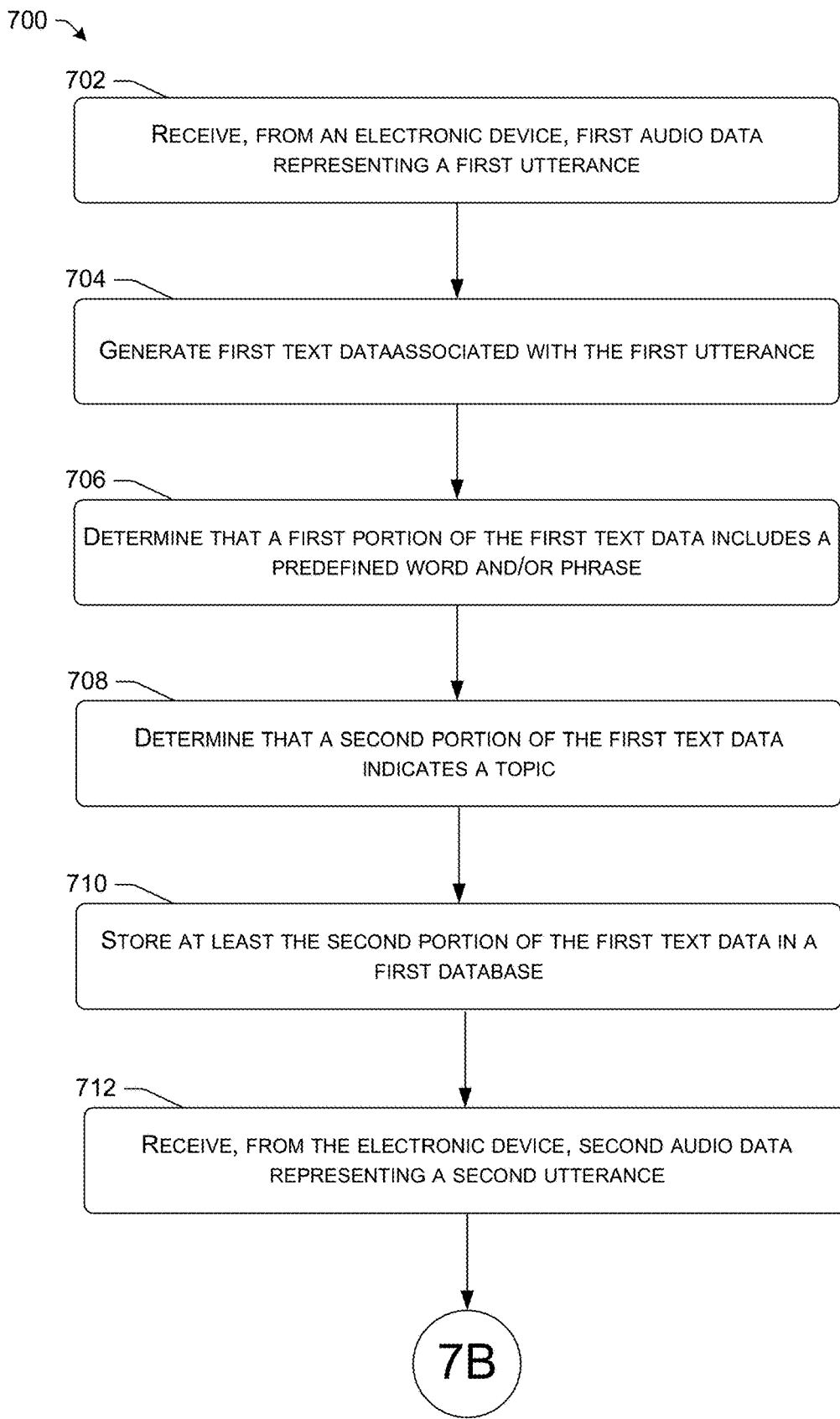
FIGS. 7A-7B illustrate an example process for adding a topic to a list of topics, and then providing an electronic device with content related to the topic.
Figure 7B:
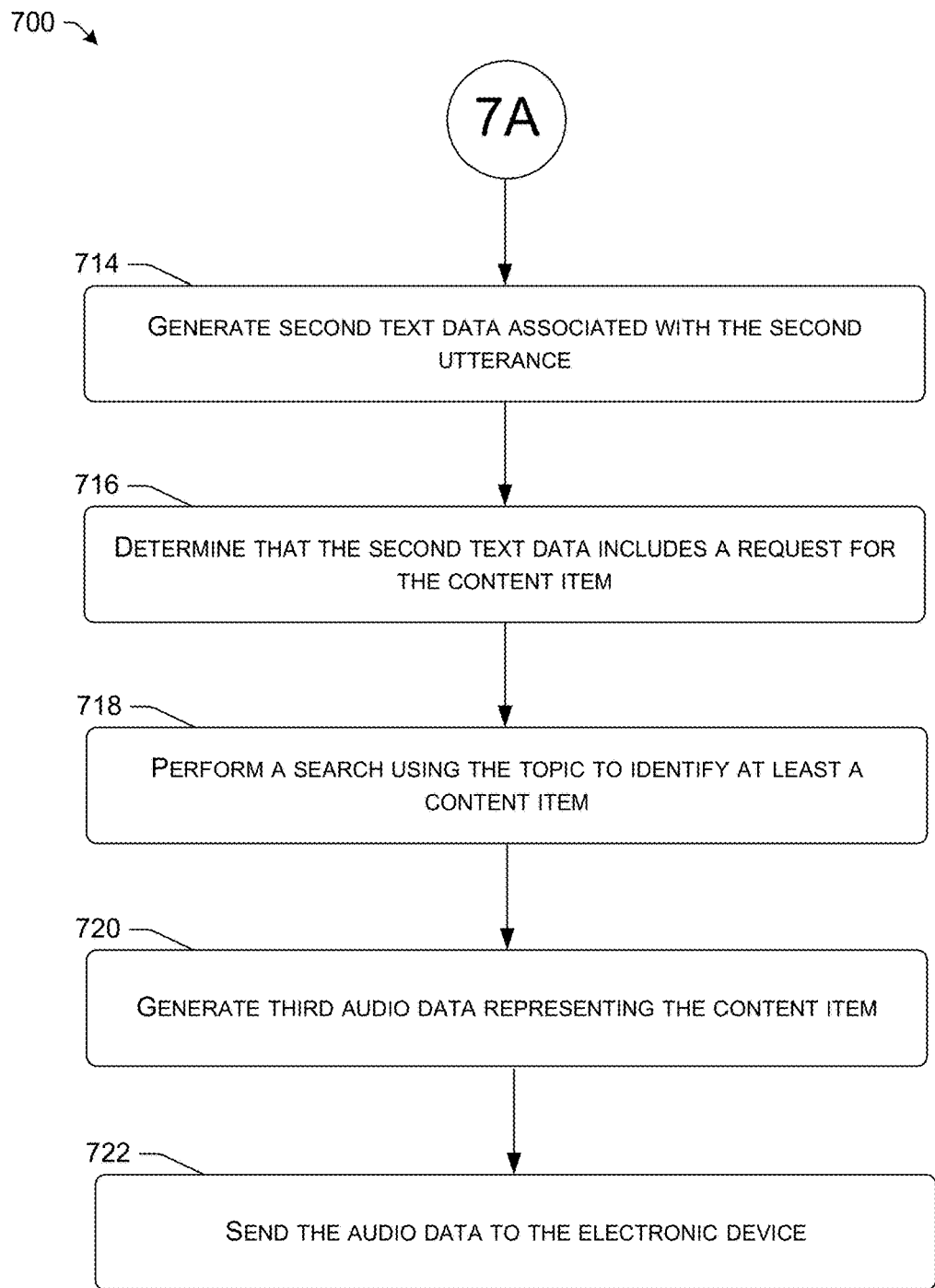

FIGS. 7A-7B illustrate an example process 700 for adding a topic to a list of topics, and then providing an electronic device with content related to the topic. The process 700, as well as each process described herein, is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Additionally, any number of the described blocks can be optional and eliminated to implement the processes.

At 702, the process 700 receives, from an electronic device, first audio data representing a first utterance and at 704, the process 700 generates first text data associated with the first utterance. For instance, the remote system 202 may receive the first audio data from an electronic device of a user, such as a voice-controlled device. The remote system 202 can then process the first audio data using one or more algorithms associated with speech recognition in order to convert the first audio data to the first text data, which can represent the first utterance.

At 706, the process 700 determines that a first portion of the first text data includes a predefined word and/or phrase and at 708, the process 700 determines that a second portion of the first text data indicates a topic. For instance, the remote system 202 can analyze the first text data to determine that the first portion of the first text data includes the predefined word and/or phrase associated with adding a topic to a list of topics (e.g., store the topic in a topic database). For example, the first portion of the first text data can include the phrase "lookout for" or "add this to my list." The remote system 202 can then analyze the first text data to determine that the second portion of the first text data includes the topic. As described above, the topic can correspond to a topic that the user is requesting the remote system 202 to identify related content. At 710, the process 700 stores at least the second portion of the first text data in a first database.

At 712, the process 700 receives, from the electronic device, second audio data representing a second utterance and at 714, the process 700 generates second text data associated with the second utterance. For instance, the remote system 202 may receive the second audio data from the electronic device of the user, where the second audio data represents the second utterance from the user. The remote system 202 can the process the second audio data using one or more algorithms associated with speech recognition in order to convert the second audio data to the second text data, which can represent the second utterance.

At 716, the process 700 determines that the second text data includes a request for the content item. For example, the remote system 202 can analyze the second text data to determine that the second text data includes the request for the second content item. In some instances, the request may be specific to the topic. For example, if the topic includes "Keanu Reeves", then the second text data may include "What did you find about Keanu Reeves". In some instances, the request may be general to all of the topics that the user has requested the remote system to identify content (e.g., all topics in the list of topics). For example, the second text data may include "What stories did you find", "What's on my lookout list", "What's up", or "What's trending".

At 718, the process 700 performs a search using the topic to identify at least a content item. For instance, based on receiving the request for the content item, remote system 202 can perform a search using the topic (and/or any other topics stored in the first database) to identify the content item related to the topic. In some instances, the remote system 202 performs the search using one or more local and/or remote databases.

At 720, the process 700 generates third audio data representing the content item and at 722, the process 700 sends the audio data to the electronic device. For instance, the remote system 202 can then generate the third audio data that represents the content item. In some instances, the third audio data represents information associated with the content item, such as a portion of the content item. In some instances, the third audio data represents the entire content item. The remote system 202 then sends the third audio data to the electronic device for output by the electronic device.

Figure 8:
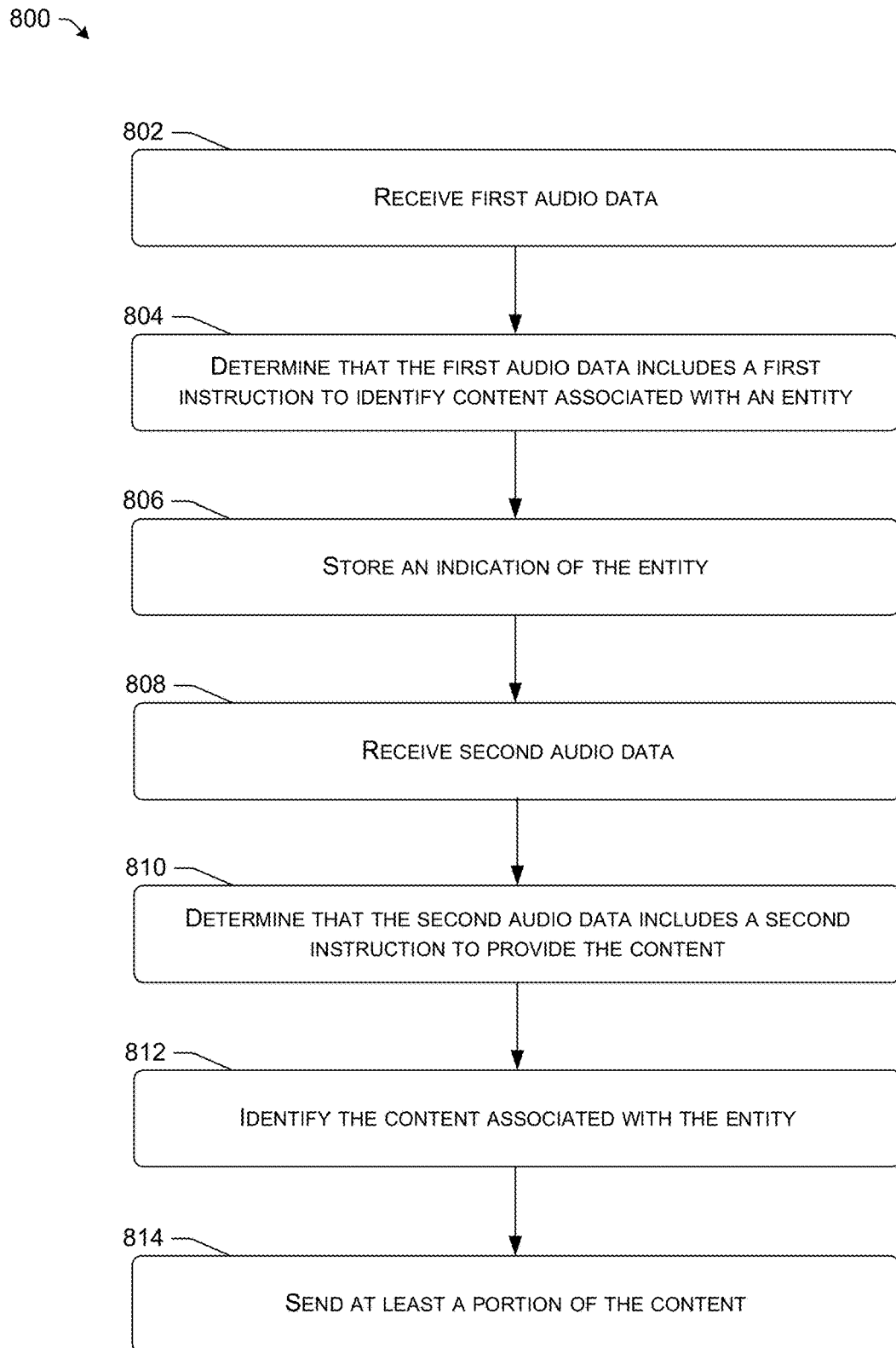
FIG. 8 illustrates an example process for identifying and then providing content related to a topic, where the content is identified and provided based on instructions that are received from a user.

FIG. 8 illustrates an example process 800 for identifying and then providing content related to a topic, where the content is identified and provided based on receiving instructions from a user. At 802, the process 800 receives first audio data and at 804, the process 800 determines that the first audio data includes a first instruction to identify content associated with a topic. For instance, the remote system 202 may receive the first audio data from an electronic device of a user, such as a voice-controlled device. The remote system 202 can the process the first audio data using one or more algorithms associated with speech recognition in order to convert the first audio data to first text. Using the first text, the remote system 202 can determine that the first audio data includes the first instruction to identify the content associated with the topic. For example, the remote system 202 can determine that a first portion of the first text includes a predefined word and/or phrase associated with adding a topic to a list of topics and that a second portion of the firsts text includes the topic. At 806, the process 800 stores an indication of the topic, At 808, the process 800 receives second audio data and at 810, the process 800 determines that the second audio data includes a second instruction to provide the content. For instance, the remote system 202 may receive the second audio data from the electronic device of the user, where the second audio data represents a second utterance from the user. The remote system 202 can the process the second audio data using one or more algorithms associated with speech recognition in order to convert the second audio data to second text. Using the second text, the remote system 202 can determine that the second audio data includes the second instruction to provide the content. For example, the remote system 202 can determine that the second text includes a predefined word and/or phrase associated with retrieving content from the remote system 202.

At 812, the process 800 identifies the content associated with the topic. For instance, the remote system 202 can perform a search using the topic to identify the content that is associated with the topic. In some instances, the remote system 202 performs the search using one or more local and/or remote databases.

At 814, the process 800 sends at least a portion of the content. For instance, based on determining that the second audio data includes the second instruction, the remote system 202 can retrieve the content from the database. The remote system 202 can then send the at least the portion of the content to the electronic device. In some instances, the at least the portion of the content can include one or more content items associated with the topic. Additionally, or alternatively, in some instances, the at least the portion of the content can include a respective portion of each of one or more content items.

Figure 9:
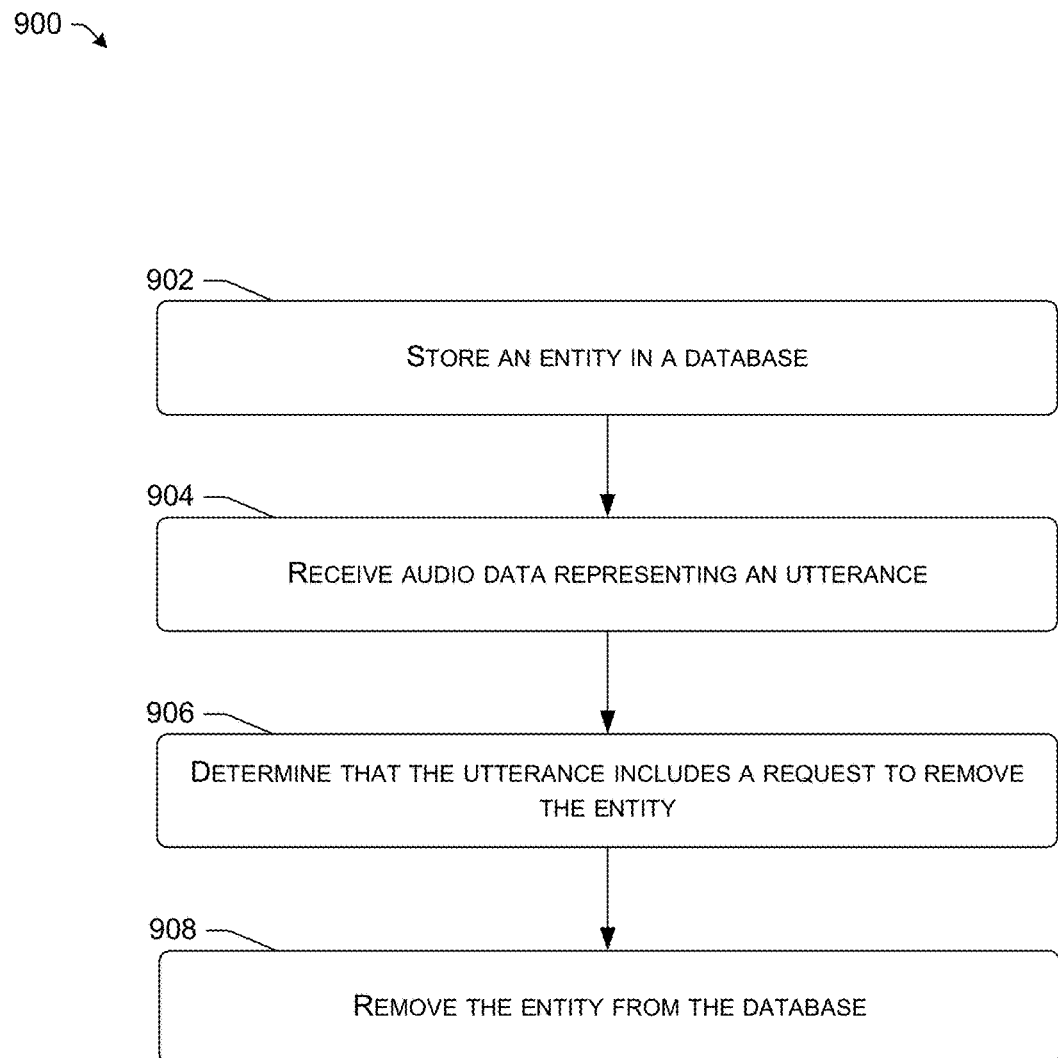
FIG. 9 illustrates an example process for removing a topic from a database.

FIG. 9 illustrates an example process 900 for removing a topic from a database. At 902, the process 900 stores a topic in a database. For instance, after receiving audio data that represents a request to identify content related to the topic, the remote system 202 can store the topic in the database. In some instances, storing the topic in the database can add the topic to a list of topics for which the remote system 202 identifies content for the user.

At 904, the process 900 receives audio data representing an utterance and at 906, the process 900 determines that the utterance includes a request to remove the topic. For instance, the remote system 202 may receive the audio data from an electronic device of the user, such as a voice-controlled device. The remote system 202 can the process the audio data using one or more algorithms associated with speech recognition in order to convert the audio data to the text, which can represent the utterance. Additionally, the remote system 202 can analyze the text to determine that text includes the request to remove the topic. For example, the remote system 202 can determine that a first portion of the text includes a predefined word and/or phrase associated with removing topics from a list of topics, such as "Stop looking out for" or "Remote from list". The remote system 202 can then determine that a second portion of the text includes the topic.

At 908, the process 900 removes the topic from the database. For example, based on determining that the utterance includes the request to remove the topic, the remote system 202 can remove the topic from the database. In some instances, removing the topic from the database can include deleting any data representing the topic that is stored in the database. In some instances, the remote system 202 can then generate and send the electronic device audio data indicating that the topic was removed from the list of topics and/or that the remote system 202 is no longer searching for content related to the topic.

Figure 10:
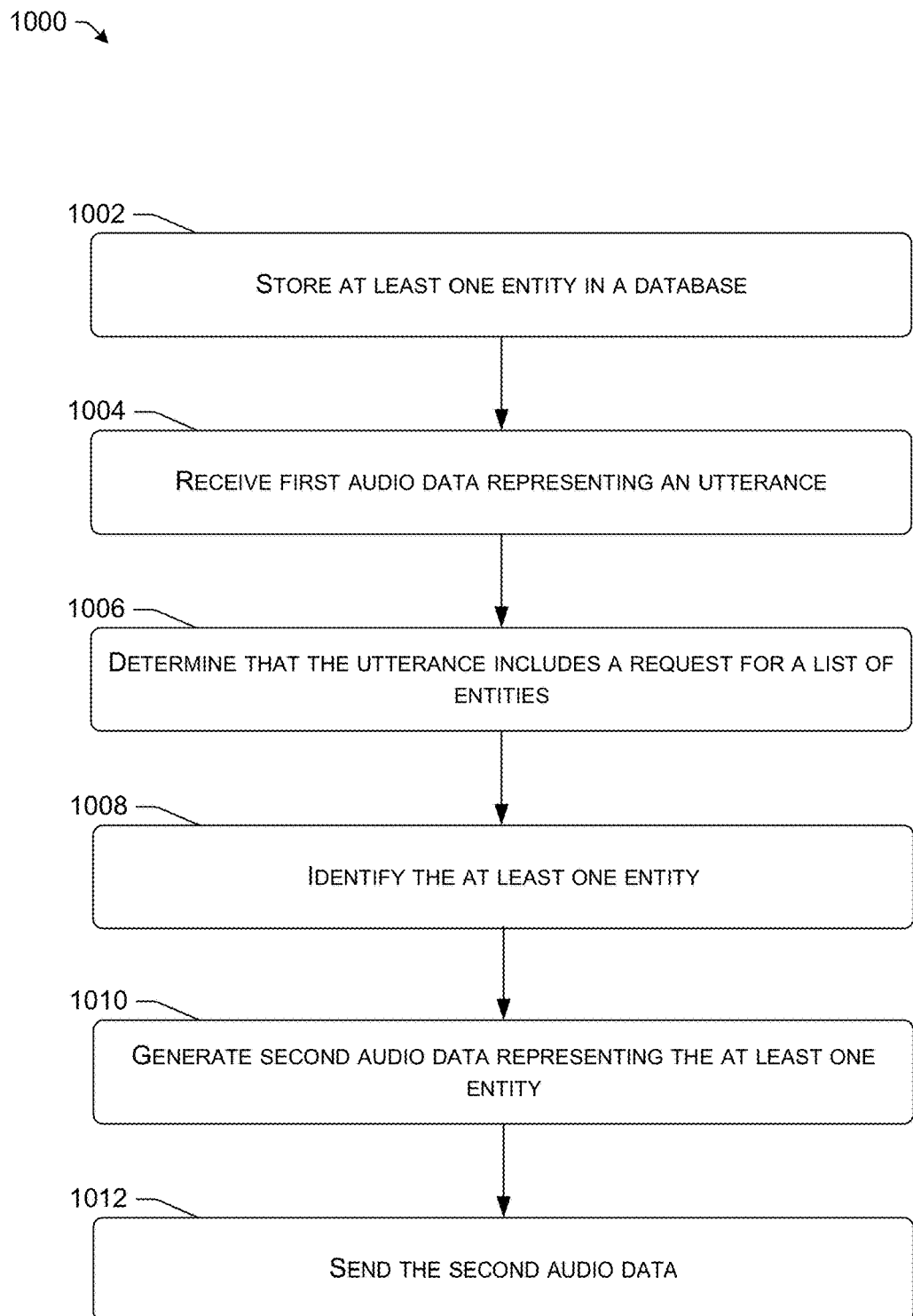
FIG. 10 illustrates an example process for providing a user with information indicating which topics are included in a list of topics.

FIG. 10 illustrates an example process 1000 for providing a user with information indicating which topics are included in a list of topics. At 1002, the process 1000 stores at least one topic in a database. For example, the remote system can receive audio data from an electronic device, such as a voice-controlled device, that represents one or more requests to add the at least one topic to a list of topics. Each time the remote system 202 receives the audio data, the remote system 202 can store a new topic in the database. Additionally, the remote system can search for and identified content related to the at least one topic.

At 1004, the process 1000 receives first audio data representing an utterance and at 1006, the process 1000 determines that the utterance includes a request for a list of topics. For instance, the remote system 202 may receive the first audio data from the electronic device, where the first audio data represents the utterance. The remote system 202 can the process the first audio data using one or more algorithms associated with speech recognition in order to convert the first audio data to the text, which can represent the utterance.

Additionally, the remote system 202 can analyze the text to determine that text includes the request for the list of topics. For example, the remote system 202 can determine that the text includes a predefined word and/or phrase associated with requesting the list of topics, such as ""What's on my lookout list" and/or "What topics are you currently searching".

At 1008, the process 1000 identifies the at least one topic and at 1010, the process 1000 generates second audio data representing the at least one topic. For example, based on determining that the utterance includes the request for the list of topics, the remote system 202 can search the database to determine that the database stores data associated with the at least one topic. The remote system 202 can then generate the second audio data that represents the list of topics. For instances, the remote system 202 can generate the second audio data to represent speech that indicates the at least one topic.

At 1012, the process 1000 sends the second audio data. For example, after generating the second audio data, the remote system 202 can send the second audio data to the electronic device. The electronic device can then receive the second audio data from the remote system 202 and, in response, output audio represented by the second audio data. In some instances, the audio can include the speech that indicates the at least one topic.

Figure 11:
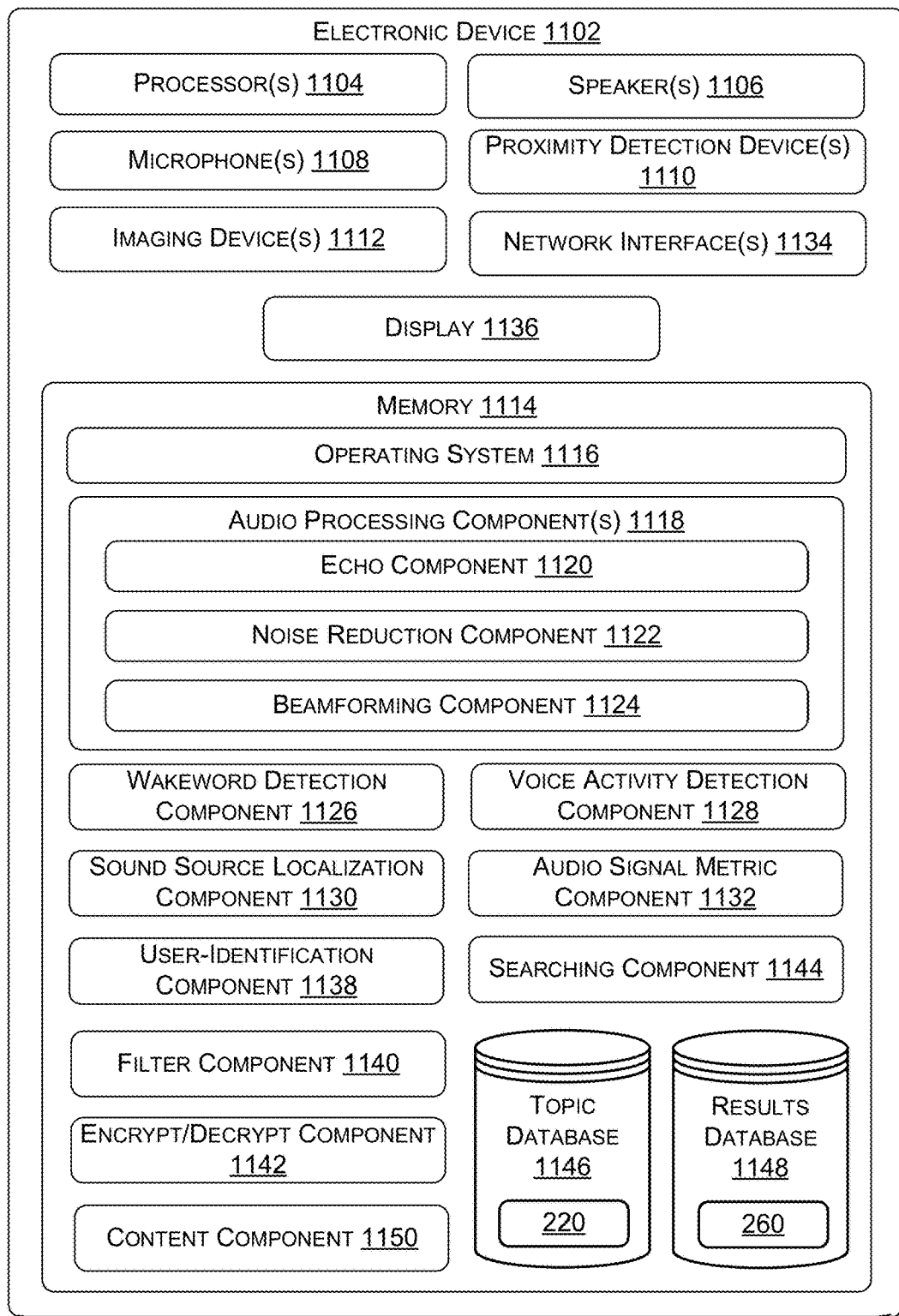
FIG. 11 illustrates a block diagram of an example architecture of a voice-controlled device that generates audio signals and metadata, and sends the audio signals and metadata to a speech processing system.

FIG. 11 illustrates block diagram of an example architecture of electronic device 1102 (which may represent the electronic device 210) that generates an audio data (e.g., audio signals) and metadata, and sends the audio data and metadata to a speech processing system. In some examples, the metadata may include various audio signal metric values.

The electronic device 1102 includes one or more processors 1104, one or more speakers 1106, and one or more microphones 1108. The processors 1104 may include a central processing unit (CPU), a graphics processing unit (GPU), a microprocessor, a digital signal processor, and so on. Although not illustrated, the electronic device 1102 may also include one or more input/output devices (e.g., mouse, keyboard, etc.), one or more displays (e.g., touch screen, Liquid-crystal Display (LCD), Light-emitting Diode (LED) display, organic LED display, plasma display, electronic paper display, etc.), one or more sensors (e.g., accelerometer, magnetometer, etc.), one or more lights, and so on. Any number of components of the electronic device 1102 may be used to receive input from a user and/or to output a response.

Although the electronic device 1102 is illustrated as having one or more integral speakers 1106, in other embodiments the electronic device 1102 may not include speakers 1106. For example, the electronic device 1102 may comprise a microphone device into which a user speaks to issue commands or may comprise a device for connection to another appliance such as a television. Instead of integrated speakers 1106, embodiments such as this may use loudspeaker capabilities of other devices, including other voice-controlled devices that do have loudspeakers and different types of dedicated loudspeaker components. As one example, the electronic device 1102 may produce an audio output signal that drives an external loudspeaker. As another example, the electronic device 1102 may drive or control an external loudspeaker through a wireless data connection such as a Bluetooth connection. In other situations, the electronic device 1102 may be used in conjunction with a loudspeaker device that receives audio data and other instructions from the remote system 202, rather than from the electronic device 1102.

The microphones 1108 may include sensors (e.g., transducers) configured to receive sound. The microphones 1108 may generate input signals for audio input (e.g., sound). For example, the microphones 1108 may determine digital input signals for an utterance of a user. In some instances, the microphones 1108 are implemented in an array. The array may be arranged in a geometric pattern, such as a linear geometric form, circular geometric form, or any other configuration. For example, for a given point, an array of four sensors may be placed in a circular pattern at 90 degree increments (e.g., 0, 90, 180, 2110) to receive sound from four directions. The microphones 1108 may be in a planar configuration, or positioned apart in a non-planar three-dimensional region. In some implementations, the microphones 1108 may include a spatially disparate array of sensors in data communication. For example, a networked array of sensors may be included. The microphones 1108 may include omni-directional microphones, directional microphones (e.g., shotgun microphones), and so on.

In some examples, the microphones 1108 and the speakers 1106 facilitate interactions, such as dialogue, with user. The microphones 1108 produce audio data representing sound from the environment of the electronic device 1102, such speech utterances 232 by the user 204. The audio data produced by the microphones 1108 may comprise directional audio signals or may be used to produce directional audio signals, where each of the directional audio signals emphasizes audio from a different radial direction relative to the microphones 1108.

The processors 1104 of the electronic device 1102 may be coupled to the components of the electronic device 1102 to cause the electronic device 1102 to perform various actions or operations. In some examples, the electronic device 1102 may include one or more proximity detection devices 1110, such as a camera, a ranging device, or other sensor that is used to determine the portion of the user 806 relative to the electronic device 1102, and generate corresponding proximity or distance data. This proximity or distance data may be used as metadata for purposes of arbitration.

The electronic device 1102 may also include imaging devices 1112 which take images of the environment of the user. For instance, upon detecting a wakeword or other wake event, the electronic device 1102 may collect image data using the imaging devices 1112. The imaging devices may include a camera, thermal imaging device, or any other type of imaging device 1112 to capture images of the environment. The imaging devices 1112 may generate image data, which in turn may be used as metadata for purposes of arbitration.

The electronic device 1102 may include memory 1114. The memory 1114 may be used to store any number of software components that are executable by the processors 1104. Software components stored in the memory 1114 may include an operating system 1116 that is configured to manage hardware and services within and coupled to the electronic device 1102. In addition, executable components stored by the memory 1114 may include audio processing components 1118 configured to produce an audio data using the microphones 1108. The audio processing components 1118 may include functionality for processing microphone audio data generated by the microphones 1108 and/or output audio data provided to the speakers 1106. As an example, the audio processing components 1118 may include an acoustic echo cancellation or suppression component 1120 for reducing acoustic echo generated by acoustic coupling between the microphones 1108 and the speaker 1106. The audio processing components 1118 may also include a noise reduction component 1122 for reducing noise in received audio data, such as elements of microphone audio data other than user speech.

The audio processing components 1118 may include one or more audio beamformers or beamforming components 1124 configured to generate directional audio signals that are focused in different directions. More specifically, the beamforming components 1124 may be responsive to audio data from spatially separated microphone elements of the microphones 1108 to produce directional audio signals that emphasize sounds originating from different areas of the environment of the electronic device 1102 or from different directions relative to the electronic device 1102. The beamforming components 1124 may in some cases produce audio signal metric values that may be used in arbitration. For example, the beamforming components 1124 may indicate a signal strength of voice activity level corresponding to each directional audio signal.

Executable components stored in the memory 1114 and executed by the processors 1104 may include a wakeword detection component 1126 that monitors one or more of the directional audio signals to detect user utterances of the system of the trigger expression. As described above, wakeword detection may be implemented using keyword spotting technology, as an example.

The software components may also include a voice activity detection component 1128 configured to monitor levels of voice presence in the directional audio signals produced by the beamforming component 1124. Levels of voice presence may be used as am audio signal metric value for purposes of arbitration. In some examples, the voice activity may include an indication of the signal strength of the speech utterance 232 and an indication of ambient noise in the environment 202. For instance, the voice activity may be a ratio of the signal strength of the speech utterance 232 in an audio data with the ambient noise in the audio data.

Software components of the electronic device 1102 may also include a sound source localization (SSL) component 1130 that may be used to determine the distance of the user 806 from the electronic device 1102. The SSL component 1130 is configured to analyze differences in arrival times of received sound at the respective microphones of the microphones 1108 in order to determine the position from which the received sound originated. For example, the SSL component 1130 may use time-difference-of-arrival (TDOA) techniques to determine the position or direction of a sound source. The determined position may be used as an audio signal metric value for purpose of performing arbitration as described herein.

The electronic device 1102 also has various hardware components, not shown, such as communication components, power components, I/O components, signal processing components indicators, control buttons, amplifiers, etc. For instance, rather than receiving a "wake-word" to wake up, an electronic device 1102 instead begin listening in response to a user 806 pressing a button on the electronic device 1102.

The electronic device 1102 may have one or more network interfaces(s) 1134 such as a wireless or Wi-Fi network communications interface, an Ethernet communications interface, a cellular network communications interface, a Bluetooth communications interface, etc., for communications with the remote system 202 over various types of networks, including wide-area network, local-area networks, private networks, public networks etc. In the case of a wireless communications interfaces, such interfaces may include radio transceivers and associated control circuits and logic for implementing appropriate communication protocols.

As also illustrated in FIG. 11, the electronic device 1102 may further include a display 1136. In some instances, the display 1136 can include any device that is capable of displaying content to a user. In some instances, the display 1136 can include a touchscreen that is capable of receiving input from the user. In some instances, the electronic device 1102 may not include the display 1136. In such instances, the electronic device 1102 may be referred to as a voice-controlled device.

In some instances, the electronic device 1102 may perform some and/or all of the processing described above with regard to the remote system 202. For instance, as such illustrated in FIG. 11, the electronic device 1102 may further include a user-identification component 1138, a filter component 1140, an encryption/decryption component 1142, a searching component 1144, a topic database 1146, a results database 1148, and a content component 1150. In some instances, the user-identification component 1138, the filter component 1142, the encryption/decryption component 1142, the searching component 1144, and the content component 1150 may respectively represent, and respectively include the functionality of, the user-identification component 232, the filter component 226, the encryption/decryption component 228, the searching component 250, and the content component 220.

Additionally, the topic database 1146 can store data 220 representing the one or more topics that are included in the list of topics for a user. Similar to the remote system 202 described above, the electronic device 1102 can perform a search using the data 220 in order to identify the content items 160. The electronic device 1102 can then store the content items 160 in the results database 1148.

Figure 12A:
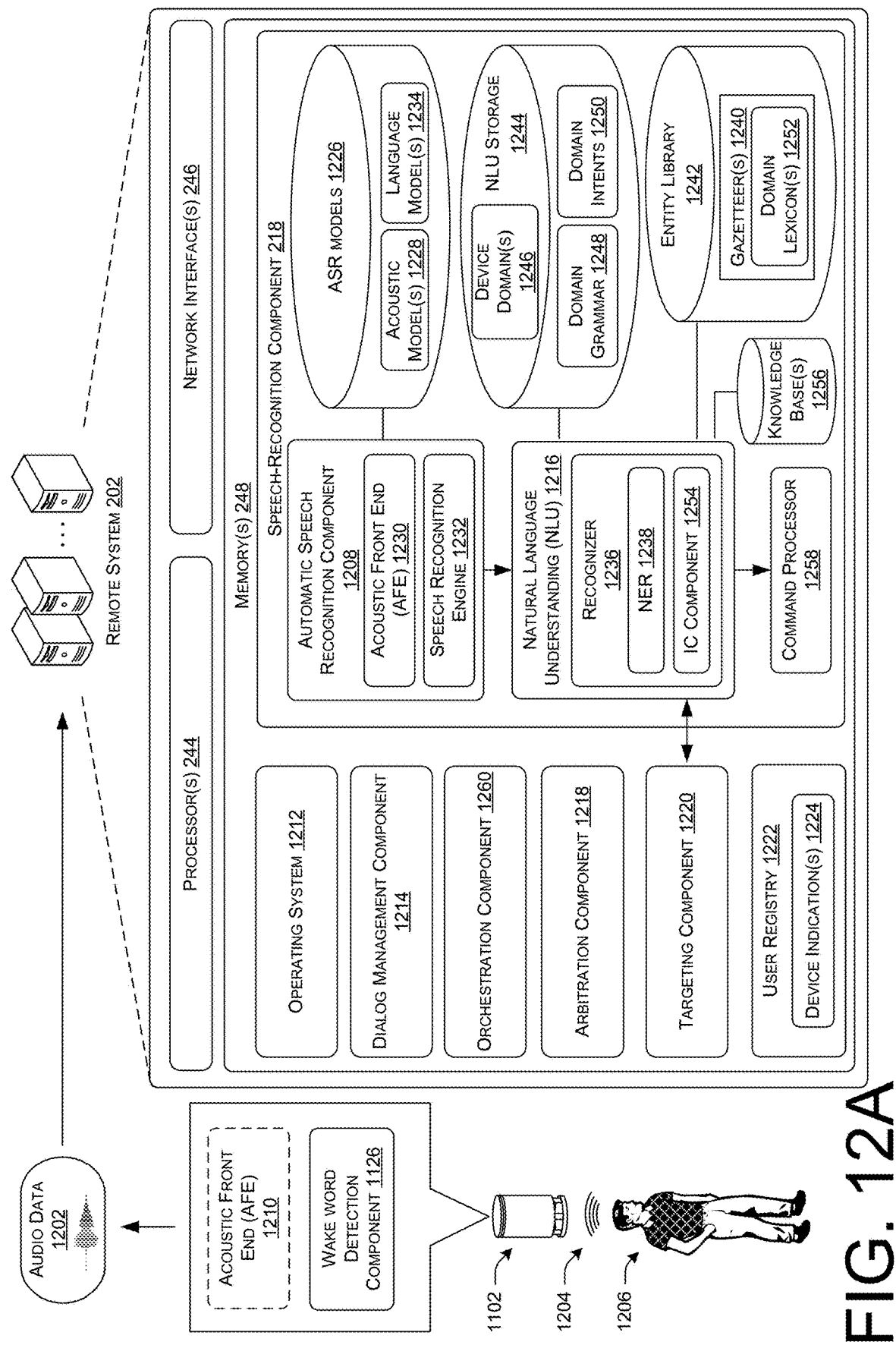
FIG. 12A illustrates a block diagram of an example architecture of a remote system which receives audio data and audio data metric values from voice-controlled devices, and performs speech processing to respond to a speech utterance of a user represented in an audio data.

FIG. 12A illustrates a block diagram of an example architecture of a remote system 202 which receives audio data 1202 (e.g., audio signal(s)) and audio data metric values from voice-controlled devices 1102, and performs processing techniques to determine which of the voice-controlled devices 1102 is to respond to a speech utterance 1204 (e.g., utterance(s) 124, utterance(s) 166, utterance(s) 174, and/or utterance(s) 178) of a user 1206 (e.g., user 116) represented in the audio data 1202.

FIG. 12A includes a conceptual diagram of how a speech utterance 1204 can be processed, allowing a system to capture and execute commands spoken by a user 1206, such as spoken commands that may follow a wakeword. The various components illustrated may be located on a same or different physical devices. Communication between various components illustrated in FIG. 12A may occur directly or across a network 212. An audio capture component, such as a microphone 1108 of electronic device 1102, captures audio corresponding to a speech utterance 1204. The electronic device 1102, using a wakeword detection component 1126, then processes the speech utterance 1204, or audio data corresponding to the speech utterance 1204, to determine if a keyword (such as a wakeword) is detected in the speech utterance 1204. Following detection of a wakeword, the electronic device 1102 sends audio data 1202 corresponding to the speech utterance 1204, to a computing device of the remote system 202 that includes the automatic speech recognition (ASR) component 1208. The audio data 1202 may be output from an acoustic front end (AFE) 1211 located on the electronic device 1102 prior to transmission. Or, the audio data 1202 may be in a different form for processing by a remote AFE 123, such as the AFE 123 located with the ASR component 1208.

In various examples, the remote system 202 may include one or more processors 244 to power components, devices, and actions of the remote system 202, and one or more network interfaces 246 such as a wireless or Wi-Fi network communications interface, an Ethernet communications interface, a cellular network communications interface, a Bluetooth communications interface, etc., for communications by the remote system 202 over various types of networks, including wide-area network, local-area networks, private networks, public networks etc. In the case of a wireless communications interfaces, such interfaces may include radio transceivers and associated control circuits and logic for implementing appropriate communication protocols.

The remote system 202 may further include memory(s) 248 which stores various components, components, or other executable software to perform speech processing to respond to a command in the speech utterance 1204. The memory(s) 248 may store an operating system 1212 that is configured to manage hardware and services within and coupled to the remote system 202.

The memory(s) 248 may further store a dialog management component 1214 that is responsible for conducting speech dialogs with the user 1206 in response to meanings or intents of user speech determined by the natural language understanding (NLU) component 1216. The dialog management component 1214 may include domain logic that is used to analyze the meaning of user speech and to determine how to respond to the user speech. The dialog management component 1214 may define rules and behaviors relating to different information or topic domains, such as news, traffic, weather, to-do lists, shopping lists, music, home automation, retail services, and so forth. The domain logic maps spoken user statements to respective domains and is responsible for determining dialog responses and/or actions to perform in response to user utterances.

The memory(s) 248 may further include an arbitration component 1218, a targeting component 1220, and a user registry 1222 including the device indications 1224. The arbitration component 1218 may perform various functions or processes for determining a ranked list of devices based on audio data metric values for voice-controlled devices 1002 that generated audio data 1202 corresponding to a speech utterance 1204. The targeting component 1220 may perform various operations for determining which voice-controlled devices 1002 are to respond to a command in the speech utterance 1204. For instance, the targeting component 1220 may determine, using the user registry 926, all of the voice-controlled devices 1002 and/or secondary devices associated with a user and/or environment. The targeting component 1220 may use the ranked list of devices, intent expressed in the speech utterance 1204 determined by the NLU component 1216, and the devices states stored in the device indications 926 to determine which of the devices should perform the command indicated in the speech utterance 1204.

The remote system 202 may further include various components for processing a speech utterance 1204, such as the ASR component 1208 and the NLU component 1216. The various components illustrated may be located on a same or different physical devices.

In some examples, audio data (e.g., audio data 1202) may be received by the remote system 202 for speech processing for interpretation of the included speech utterance 1204

(either for purposes of enabling voice-communications and/or for purposes of executing a command in the speech). The audio data may include data corresponding to the wakeword, or the portion of the audio data corresponding to the wakeword may be removed by the electronic device 1102 prior to sending. Upon receipt by the remote system 202, the ASR component 1208 may convert the audio data into text. The ASR component 1208 transcribes audio data into text data representing the words of the speech contained in the audio data. The text data may then be used by other components for various purposes, such as arbitration, executing system commands, inputting data, etc. A speech utterance 1204 in the audio data is input to a processor configured to perform ASR which then interprets the utterance based on the similarity between the utterance and pre-established ASR language models stored in an ASR model knowledge base (ASR Models Storage 1226). For example, the ASR process may compare the input audio data with models for sounds (e.g., subword units or phonemes) and sequences of sounds to identify words that match the sequence of sounds spoken in the utterance of the audio data.

The different ways a speech utterance 1204 may be interpreted (i.e., the different hypotheses) may each be assigned an ASR probability or an ASR confidence score representing the likelihood that a particular set of words matches those spoken in the utterance. The ASR confidence score may be based on a number of factors including, for example, the similarity of the sound in the utterance to models for language sounds (e.g., an acoustic model 1228 stored in an ASR Models Storage 1226), and the likelihood that a particular word which matches the sounds would be included in the sentence at the specific location (e.g., using a language or grammar model). Thus, each potential textual interpretation of the spoken utterance (hypothesis) is associated with an ASR confidence score. Based on the considered factors and the assigned ASR confidence score, the ASR component 1208 outputs the most expected text recognized in the audio data. The ASR component 1208 may also output multiple ASR hypotheses in the form of a lattice or an N-best list with each hypothesis corresponding to an ASR confidence score or other score (such as probability scores, etc.).

The device or devices performing the ASR processing may include an acoustic front end (AFE) 1230 and a speech recognition engine 1232. The AFE 1230 transforms the audio data from the microphone into data for processing by the speech recognition engine 1232. The speech recognition engine 1232 compares the speech recognition data with acoustic models 1228, language model(s) 1234, and other data models and information for recognizing the speech conveyed in the audio data. The AFE 1230 may reduce noise in the audio data and divide the digitized audio data into frames representing time intervals for which the AFE 1230 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE 1230 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1232 may process the output from the AFE 1230 with reference to information stored in speech/model storage (1226). Alternatively, post front-end processed data (such as feature vectors) may be received by the device executing ASR processing from another source besides the internal AFE 1230. For example, the electronic device 1102 may process audio data into feature vectors (for example using an on-device AFE 1230) and transmit that information to a server across a network for ASR processing. Feature vectors may arrive at the remote system 202 encoded, in which case they may be decoded prior to processing by the processor executing the speech recognition engine 1232.

The speech recognition engine 1232 attempts to match received feature vectors to language phonemes and words as known in the stored acoustic models 1228 and language model(s) 1234. The speech recognition engine 1232 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 1232 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1232 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 202, for natural language understanding (NLU) processing, such as conversion of the text into commands for execution, either by the user device, by the remote system 202, or by another device (such as a server running a specific application like a search engine, etc.).

The NLU component 1216 (e.g., server) may include various components, including potentially dedicated processor(s), memory, storage, etc. As shown in FIG. 12A, the NLU component 1216 may include a recognizer 1236 that includes a named topic recognition (NER) component 1238 which is used to identify portions of query text that correspond to a named topic that may be recognizable by the system. A downstream process called named topic resolution links a text portion to a specific topic known to the system. To perform named topic resolution, the system may utilize gazetteer information 1240 stored in topic library storage 1242. The gazetteer information may be used for topic resolution, for example matching ASR results with different topics (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU component 1216 takes textual input (such as the textual input determined by the ASR component 1208) and attempts to make a semantic interpretation of the text. That is, the NLU component 1216 determines the meaning behind the text based on the individual words and then implements that meaning. NLU component 1216 interprets a text string to derive an intent or a desired action from the user as well as the pertinent pieces of information in the text that allow a device (e.g., electronic device 1102) to complete that action. For example, if a spoken utterance is processed using ASR component 1208 and outputs the text "turn off the alarm" the NLU component 1216 may determine that the user 1206 intended that the electronic device 1102 be instructed to turn off an alarm sound being output. As another example, if the spoken utterance is processed using ASR component 1208 and outputs the text "turn off an electronic device" the NLU component 1216 may determine that the user 1206 intended that the electronic device 1102 be instructed to send an instruction to the electronic device that causes the electronic device to switch from an on-state to an off-state.

The NLU component 1216 may process several textual inputs related to the same utterance. For example, if the ASR component 1208 outputs N text segments (as part of an N-best list), the NLU component 1216 may process all N outputs to obtain NLU results.

To correctly perform NLU processing of speech input, the NLU component 1216 may be configured to determine a "domain" of the utterance so as to determine and narrow down which services offered by the endpoint device (e.g., remote system 202 or the electronic device 1102) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The NER component 1238 receives a query in the form of ASR results and attempts to identify relevant grammars and lexical information that may be used to construe meaning. To do so, the NLU component 1216 may begin by identifying potential domains that may relate to the received query. The NLU storage 1244 includes a database of device domain(s) 1246 which identify domains associated with specific devices. For example, the electronic device 1102 may be associated with domains for music, telephony, calendaring, contact lists, and device-specific communications, but not video. In addition, the device domain(s) 1246 may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 1236, language model and/or grammar databases 1248, a particular set of domain intents/actions 1250, and a particular personalized domain lexicon 1252. Each gazetteer 1240 may include domain-indexed lexical information associated with a particular user and/or device. A user's contact-list lexical information might include the names of contacts. Since every user's contact list is presumably different, this personalized information improves topic resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains is ordinarily selected to be the correct result.

An intent classification (IC) component 1254 parses the query to determine an intent or intents for each identified domain, where the intent corresponds to the action to be performed that is responsive to the query. Each domain is associated with a database (e.g., domain intents 1250) of words linked to intents. For example, a music domain intent database 430 may link words and phrases such as "quiet," "volume off," and "mute" to a "mute" intent. A voice-message domain intent database, meanwhile, may link words and phrases such as "send a message," "send a voice message," "send the following," or the like. The IC component 1254 identifies potential intents for each identified domain by comparing words in the query to the words and phrases in the domain intents 1250. In some instances, the determination of an intent by the IC component 1254 is performed using a set of rules or templates that are processed against the incoming text to identify a matching intent.

In order to generate a particular interpreted response, the NER component 1238 applies the grammar models and lexical information associated with the respective domain to actually recognize a mention one or more topics in the text of the query. In this manner, the NER component 1238 identifies "slots" (i.e., particular words in query text) that may be needed for later command processing. Depending on the complexity of the NER component 1238, it may also label each slot with a type of varying levels of specificity (such as noun, place, city, artist name, song name, or the like). Each grammar model includes the names of topics (i.e., nouns) commonly found in speech about the particular domain (i.e., generic terms), whereas the lexical information 1252 from the gazetteer 1240 is personalized to the user(s) and/or the device. For instance, a grammar model associated with the shopping domain may include a database of words commonly used when people discuss shopping.

The intents identified by the IC component 1254 are linked to domain-specific grammar frameworks (included in 1250) with "slots" or "fields" to be filled. Each slot/field corresponds to a portion of the query text that the system believes corresponds to a topic. To make resolution more flexible, these frameworks would ordinarily not be structured as sentences, but rather based on associating slots with grammatical tags. For example, if "send a message" is an identified intent, a grammar framework or frameworks may correspond to sentence structures such as "Send a message to {contact}," "Send a voice message to {contact}," "Send the following to {contact}," etc.

For example, the NER component 1238 may parse the query to identify words as subject, object, verb, preposition, etc., based on grammar rules and/or models, prior to recognizing named topics. The identified verb may be used by the IC component 1254 to identify intent, which is then used by the NER component 1238 to identify frameworks. A framework for the intent of "send a message," meanwhile, may specify a list of slots/fields applicable to play the identified "contact" and any object modifier (e.g., specifying a device of the recipient) or the like. The NER component 1238 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1238 may search the database of generic words associated with the domain (in the knowledge base 1256). So, for instance, if the query was "send message to Joe," after failing to determine a last name for "Joe," the NER component 1238 may search the domain vocabulary for the word "Joe." In the alternative, generic words may be checked before the gazetteer information, or both may be tried, potentially producing two different results.

The output data from the NLU component 1216 (which may include tagged text, commands, etc.) may then be sent to the command processor 1258. The destination command processor 1258 may be determined based on the NLU output. For example, if the NLU output includes a command to send a message, the destination command processor 1258 may be a message sending application, such as one located on the user device or in a message sending appliance, configured to execute a message sending command. If the NLU output includes a search request, the destination command processor 1258 may include a search engine processor, such as one located on a search server, configured to execute a search command.

The NLU operations of existing systems may take the form of a multi-domain architecture. Each domain (which may include a set of intents and topic slots that define a larger concept such as music, books etc. as well as components such as trained models, etc. used to perform various NLU operations such as NER, IC, or the like) may be constructed separately and made available to an NLU component 1216 during runtime operations where NLU operations are performed on text (such as text output from an ASR component 1208). Each domain may have specially configured components to perform various steps of the NLU operations.

For example, in an NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1236. Each recognizer may include various NLU components such as an NER component 1238, IC component 1254 and other components such as a topic resolver, or other components.

As noted above, multiple devices may be employed in a single remote system 202. In such a multi-device system, each of the devices may include different components for performing different aspects of the speech processing. The multiple devices may include overlapping components. The components of the electronic device 1102 and the remote system 202, as illustrated herein are exemplary, and may be located in a stand-alone device or may be included, in whole or in part, as a component of a larger device or system, may be distributed across a network or multiple devices connected by a network, etc.

Figure 12B:
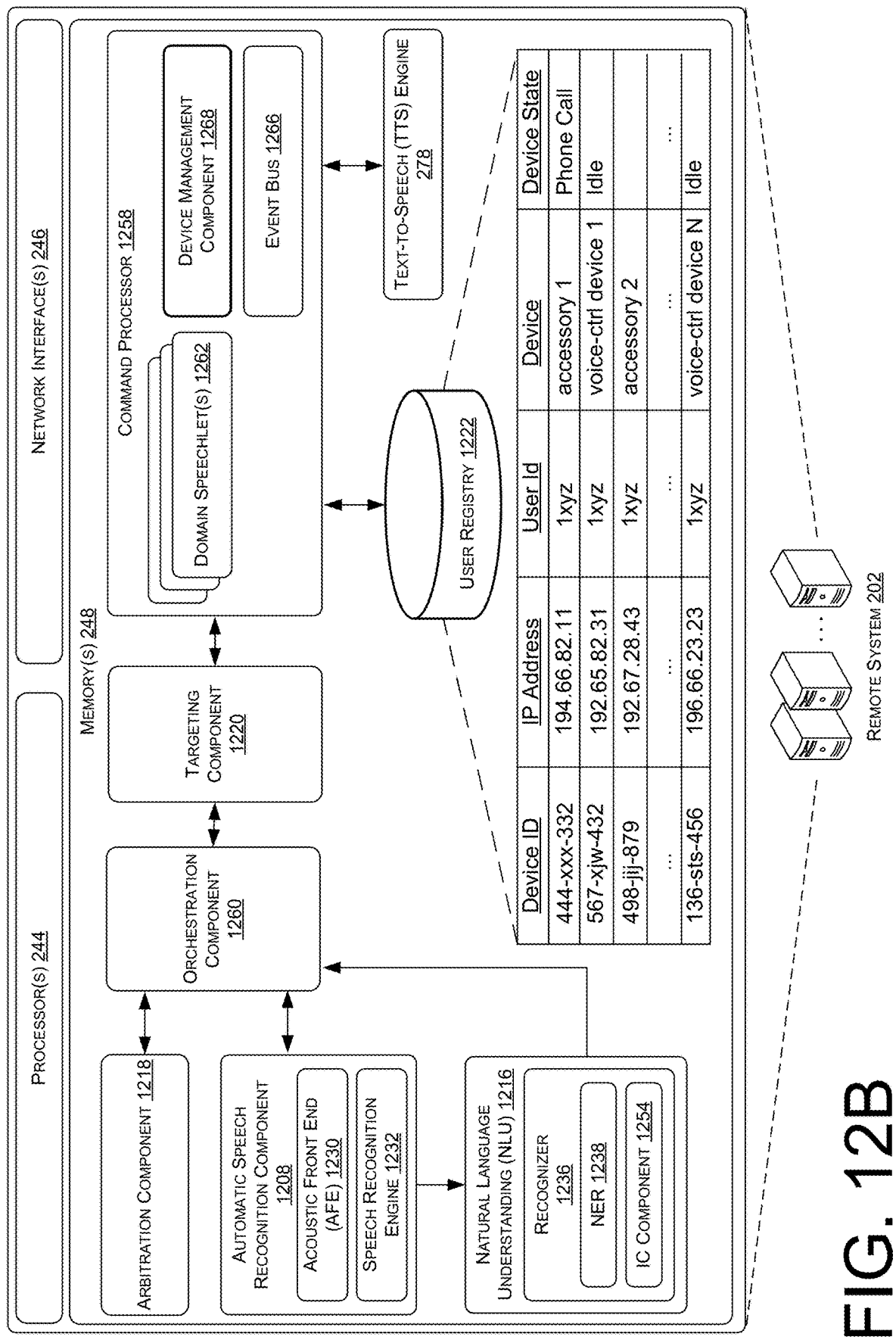
FIG. 12B illustrates a block diagram of an example architecture of a remote system including a command processor configured to make a decision as to which voice-controlled device is to respond to a speech utterance of a user.

FIG. 12B illustrates a block diagram of an example architecture of the remote system 202 including the command processor 1258 configured to generate a command that the selected electronic device 1102 uses to respond to the speech utterance 1204. As illustrated in FIG. 12B, the remote system 202 includes the orchestration component 1260 and a speech-recognition component 128 comprising the ASR component 1208 and the NLU component 1216, may be coupled to the targeting component 1220 and provide the targeting component with the intent determined to be expressed in the speech utterance 1204. The orchestration component 1260 may stream the audio data 1202 to the ASR component 1208, which detects the speech utterance 1204 endpoint and sends a message to the voice-enabled device 1002 to close the stream of the audio data 1202. The ASR component 1208 may then return the textual data to the orchestration component 1260. In various examples, the textual data corresponding to the speech utterance 1204 may be sent from the orchestration component 1260 to the NLU component 1216 to be analyzed or processed by the NLU component 1216 to determine an intent expressed by the user 1206 in the speech utterance 1204. Once the intent has been determined by the NLU component 1216, the orchestration component 1260 may pass the intent to a targeting component 1220 to use to determine which of the voice-enabled devices 1002 is to respond to the speech utterance 1204.

Further, the arbitration component 1218 may provide the ranked list of devices to the targeting component 1220, as well as device indicators (e.g., IP addresses, devices names, etc.) for one or more of the voice-controlled devices 1002 in the ranked list of devices. The targeting component 1220 may then perform techniques to determine a target device (e.g., a device to perform the requested operation), and provide various data to the command processor 1258. For instance, the targeting component 1220 may provide the command processor 1258 with various device identifiers of the voice-controlled devices 1002, the determined target device, the determined intent and/or command, etc.

The command processor 1258 and/or NLU component 1216 may determine a domain based on the intent and, based on this determination, route the request corresponding to the audio data to the appropriate domain speechlet, such as the illustrated domain speechlets 1262. The domain speechlet 1262 may comprise any type of device or group of devices (e.g., hardware device, virtual devices or partitions, server, etc.), and may receive the text data and/or an intent associated with the audio data 1202 and determines how to respond to the request. For instance, the intent for a command "please turn of an electronic device" may be routed to a smart home domain speechlet 1262 which controls devices connected to the voice-controlled devices 1002, such as a light. The smart home domain speechlet 1262 may determine a command to generate based on the intent of the user 1206 to switch the light from an on-state to an off-state.

Various types of domain speechlets 1262 may be used to determine which devices 1002 to use to respond to a speech utterance 1204, as well as the appropriate response and potential additional content (e.g., audio data, instructions, etc.). For example, the domain speechlets 1262 may include a third party skills domain speechlet 1262 which may handle intents associated with gaming, productivity, etc., a music domain speechlet 1262 which may handle intents associated with music play requests (e.g., Amazon Music, Pandora, Spotify, iHeart, etc.), a video domain speechlet 1262 which may handle intents associated with video play requests (e.g., Amazon Video, HBO, Netflix, Hulu, etc.), a household organization domain speechlet 1262 which may handle intents associated with household activities (e.g., calendars, reminders, timers, etc.), a smart home domain speechlet 1262 which may handle intents associated with controlling smart devices (e.g., controlling lights, door locks, home monitoring, etc.), an automotive domain speechlet 1262, a shopping domain speechlet 1262 which may handle shopping requests (e.g., making a shopping list, ordering items online, etc.), and/or a weather domain speechlet 1262 which may handle requests for weather forecasts (e.g., providing a URL to a weather website, providing weather related images and/or videos, etc.).

Additionally, a lookout speechlet 1262 may handle intents associated with each of the techniques and processes described above with regard to FIGS. 1A-10. For instance, the lookout speechlet 1262 may handle events associated with identifying topics and/or topics in audio data, storing the topics in a topic database, identifying content related to the topics, providing the content to the electronic device 1002, and/or removing topics from the topic database. In some instances, the lookout speechlet 1262 may correspond to the content component 250 illustrated in FIGS. 2A-6.

After the domain speechlet 1262 generates the appropriate command based on the intent of the user 1206, and/or provides additional content, such as audio data, to be output by one of the voice-controlled devices 1002, the domain speechlet 1262 may provide this information back to the remote system 202, which in turns provides some or all of this information to a text-to-speech (TTS) engine 278. The TTS engine 278 then generates an actual audio file for outputting the second audio data (e.g., the command) determined by the domain speechlet. The audio file (or "audio data") may represents the command (e.g., text) generated by the domain speechlet 1262 and/or the additional content). After generating the file (or "audio data"), the TTS engine 278 may provide this data back to the remote system 202.

The remote system 202 may then publish (i.e., write) some or all of this information to an event bus 1266. That is, the remote system 202 may provide information regarding the initial request (e.g., the speech, the text, the domain/intent, etc.), the response to be provided to the electronic device 1102 (e.g., the command to hang up a phone call, the command to turn off an alarm, etc.), or any other information pertinent to the interaction between the electronic device 1102 and the remote system 202 to the event bus 1266.

Within the remote system 202, one or more components or services may subscribe to the event bus 1266 so as to receive information regarding interactions between electronic devices and the remote system 202. In the illustrated example, for instance, the device management component 1268 may subscribe to the event bus 1266 and, thus, may monitor information regarding these interactions. In some examples, monitoring information in the event bus 1266 may comprise communications between various components of the remote system 202. For example, the targeting component 1220 may monitor the event bus 1266 to identify device state data for voice-controlled devices 1002. In some examples, the event bus 1266 may "push" or send indications of events and/or device state data to the targeting component. Additionally, or alternatively, the event bus 1266 may be "pulled" where the targeting component sends requests to the event bus 1266 to provide an indication of device state data for an electronic device 1102. The event bus 1266 may store indications of the device states for the voice-controlled devices 1002, such as in a database (e.g., user registry 1222), and using the stored indications of the device states, send the device state data for voice-controlled devices 1002 to the targeting component. Thus, to identify device state data for an electronic device 1102, the targeting component 1220 may send a request to the event bus 1266 (e.g., event component) to provide an indication of the device state data associated with an electronic device 1102, and receive, from the event bus 1266, the device state data that was requested.

The device management component 1268 functions to monitor information published to the event bus 1266 and identify events that may trigger action. For instance, the device management component 1268 may identify (e.g., via filtering) those events that: (i) come from voice-controlled devices 1002 that are associated with secondary device(s) (e.g., have secondary devices in their environments such as televisions, personal computing devices, lights, appliances, electronic devices 208(1)-(5), etc.), and (ii) are associated with supplemental content (e.g., image data, video data, etc.). The device management component 1268 may reference the user registry 1222 to determine which voice-controlled devices 1002 are associated with secondary devices, as well as determine device types, states, and other capabilities of these secondary devices. For instance, the device management component 1268 may determine, from the information published to the event bus 1266, an identifier associated with the electronic device 1102 making the corresponding request or the electronic device 1102 selected to respond to the speech utterance 1204. The device management component 1268 may use this identifier to identify, from the user registry 1222, a user account associated with the electronic device 1102. The device management component 1268 may also determine whether any secondary devices have been registered with the identified user account, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like.

The device management component 1268 may determine whether a particular event identified is associated with supplemental content. That is, the device management component 1268 may write, to a datastore, indications of which types of events and/or which primary content or responses are associated with supplemental content. In some instances, the remote system 202 may provide access to third-party developers to allow the developers to register supplemental content for output on secondary devices for particular events and/or primary content. For example, if an electronic device 1102 is to output that the weather will include thunder and lightning, the device management component 1268 may store an indication of supplemental content such as thunder sounds, pictures/animations of lightning and the like. In another example, if an electronic device 1102 is outputting information about a particular fact (e.g., "a blue whale is the largest mammal on earth . . . "), then a secondary device, such as television, may be configured to provide supplemental content such as a video or picture of a blue whale. In these and other examples, the device management component 1268 may store an association between the primary response and/or content (e.g., outputting of information regarding the world's largest mammal) and corresponding supplemental content (e.g., the audio data, image data, or the like). In some instances, the device management component 1268 can also indicate which types of secondary devices are to output which supplemental content. For instance, in the instant example, the device management component 1268 may store an indication that secondary devices of a class type "tablet" are to output a picture of a blue whale. In these and other instances, meanwhile, the device management component 1268 may store the supplemental content in association with secondary-device capabilities (e.g., devices with speakers output the audio commentary, devices with screens output the image, etc.).

Finally, the device management component 1268 may determine how to transmit response and/or supplement content (and/or information acquiring the content) to the voice-controlled devices 1002 and/or the secondary devices. To make this determination, the device management component 1268 may determine a device type of the voice-controlled devices 1002 and/or secondary devices, capabilities of the device(s), or the like, potentially as stored in the user registry 1222. In some instances, the device management component 1268 may determine that a particular device is able to communicate directly with the remote system 202 (e.g., over WiFi) and, thus, the device management component 1268 may provide the response and/or content directly over a network to the secondary device (potentially via the remote system 202). In another example, the device management component 1268 may determine that a particular secondary device is unable to communicate directly with the remote system 202, but instead is configured to communicate with an electronic device 1102 in its environment over short-range wireless networks. As such, the device management component 1268 may provide the supplement content (or information) to the remote system 202, which in turn may send this to the electronic device 1102, which may send the information over a short-range network to the secondary device.

The memory(s) 248 may further include the user registry 1222 that includes data regarding user profiles as described herein. The user registry 1222 may be located part of, or proximate to, the remote system 202, or may otherwise be in communication with various components, for example over the network. The user registry 1222 may include a variety of information related to individual users, accounts, etc. that interact with the voice-controlled devices 1002, and the remote system 202. For illustration, the user registry 1222 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 1222 may store indications of associations between various voice-controlled devices 1002 and/or secondary device, such as virtual clusters of devices. The user registry 1222 may represent clusters of the voice-controlled devices 1002 and/or secondary devices as single devices that can receive commands and disperse the commands to each electronic device 1102 and/or secondary device in the cluster. In some examples, the virtual cluster of devices may be represented as a single device which is determined as being capable, or not capable (e.g., offline), of performing a command in a speech utterance. A virtual cluster of devices may generally correspond to a stored grouping of devices, or a stored association between a group of devices.

In some examples, the device state for devices associated with a user account may indicate a current state of the device, such as voice-controlled devices 1002 and the secondary devices. In this way, the command processor 1258 and/or the domain speechlets 1262 may determine, based on the stored device states in the user registry 1222, a current device state of the voice-controlled devices 1002 and/or the secondary devices. Rather than receiving device states for the voice-controlled devices 1002, in metadata, the devices states may already have been determined or received and stored in the user registry 1222. Further, the user registry 1222 may provide indications of various permission levels depending on the user. As an example, the remote system 202 may perform speaker recognition on the audio data 1202 to determine an identity of the speaker. If the speaker is a child for instance, the child profile may have permission restrictions where they are unable to hang up a phone call of a parent, for example. Conversely, a parent profile may be able to hang up a phone call involving a child profile, or change channel on a television when a child profile is also detected as watching the television.

In some examples, to determine the device state, the event bus 1266 may publish different events which indicate device states to various topics or components that subscribe to the event bus 1266. For instance, if an event of "set an alarm" occurs for an electronic device 1102, the event bus 1266 may publish the indication of this event, and thus the device state of an alarm is set for the electronic device 1102. Thus, various components, such as the targeting component 1220, may be provided with indications of the various device states via the event bus 1266. The event bus 1266 may further store and/or update device states for the voice-controlled devices 1002 in the user registry 1222. The components of the remote system 202 may query the user registry 1222 to determine device states.

A particular user profile may include a variety of data that may be used by the remote system 202. For example, a user profile may include information about what electronic device 1102 are associated with the user 1206. The user profile may further indicate an IP address for each of the devices associated with the user 1206, user IDs for each of the devices, indicates of the types of devices, and current device states for the devices.

It is noted that, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors; and
one or more computer-readable media storing instructions that, when executed by the one or more processors, cause the one or more processors to perform operations comprising:
receiving, from an electronic device, first audio data representing a first utterance;
performing speech recognition on the first audio data;
generating, based at least in part on performing the speech recognition on the first audio data, first text data representing the first audio data;
determining that a first portion of the first text data includes a predefined word or phrase associated with a request that the system search for content;
determining that a second portion of the first text data indicates a topic;

sending data representing the topic to a first component configured to identify topics that are included in a first list of topics;

receiving, from the first component, an indication that the topic is included in the first list of topics;

sending the data representing the topic to an encryption component;

based at least in part on sending the data representing the topic to the encryption component, receiving, from the encryption component, encrypted data representing the topic;

sending the encrypted data representing the topic to a profile component, wherein sending the encrypted data representing the topic to the profile component causes the profile component to store the encrypted data in a database associated with a second list of topics associated with a user profile; and sending, to the electronic device, second audio data indicating that the topic has been added to the second list of topics.

2. The system as recited in claim 1, the operations further comprising:

receiving, from the electronic device, third audio data representing a second utterance;

performing speech recognition on the third audio data;

generating, based at least in part on performing the speech recognition on the third audio data, second text data representing the third audio data;

determining that the second text data indicates a request that the system output content related to the topic that is included in the second list of topics;

receiving, from the profile component, the encrypted data representing the topic;

sending the encrypted data representing the topic to the encryption component;

receiving the data representing the topic from the encryption component;

sending the data representing the topic to a content component;

receiving from the content component, at least a content item related to the topic;

generating fourth audio data representing at least a portion of the content item; and sending, to the electronic device, the fourth audio data for output by the electronic device.

3. The system as recited in claim 2, wherein the topic comprises a first topic, the content item comprises a first content item, and the determining that the second text data indicates the request that the system output the content related to the topic comprises determining that the second text data indicates a request to output content related to two or more topics included in the second list of topics, and wherein the operations further comprise:

receiving, from the profile component, encrypted data representing a second topic that is included in the second list of topics;

sending the encrypted data representing the second topic to the encryption component;

receiving data representing the second topic from the encryption component;

sending the data representing the second topic to the content component; and receiving from the content component, at least a second content item related to the second topic, wherein the fourth audio data further represents at least a portion of the second content item.

4. A method comprising:

receiving, from an electronic device, first audio data representing a first utterance;

determining, based at least in part on the first audio data, that the first utterance includes a request to identify content associated with a topic;

sending data representing the topic to a first component configured to identify topics that are included in a first list of topics;

receiving, from the first component, an indication that the topic is included in the first list of topics;

causing encrypted data representing the topic to be stored in a database, wherein the database is associated with a second list of topics associated with a user profile;

receiving, from the electronic device, second audio data representing a second utterance;

determining, based at least in part on the second audio data, that the second utterance includes a request for content related to topics included in the second list of topics;

based at least in part on determining that the second utterance includes the request for the content related to the topics, determining that the encrypted data representing the topic is stored in the database; and sending, to the electronic device, third audio data representing at least a portion of a content item that is related to the topic.

5. The method as recited in claim 4, wherein the content item comprises a first content item, and wherein the method further comprises:

identifying the first content item related to the topic;

identifying a second content item related to the topic;

analyzing the first content item to determine a first date associated with the first content item;

analyzing the second content item to determine a second date associated with the second content item;

determining, based at least in part on the first date and the second date, an order for outputting the first content item and the second content item; and generating the third audio data based at least in part on the order, wherein the third audio data further represents at least a portion of the second content item.

6. The method as recited in claim 4, wherein the content item comprises a first content item, and wherein the method further comprises:

identifying the first content item related to the topic;

identifying a second content item related to the topic;

determining a number of times that the topic is included in the first content item;

determining a first correlation score for the first content item based at least in part on the number of times that the topic is included in the first content item;

determining a number of times that the topic is included in the second content item;

determining a second correlation score for the second content item based at least in part on the number of times that the topic is included in the second content item;

determining, based at least in part on the first correlation score and the second correlation score, an order for outputting the first content item and the second content item; and generating the third audio data based at least in part on the order, wherein the third audio data further represents at least a portion of the second content item.

7. The method as recited in claim 4, wherein the topic comprises a first topic and the content item comprises a first content item, and wherein the method further comprises:

receiving, from the electronic device, fourth audio data representing a third utterance;

determining, based at least in part on the fourth audio data, that the third utterance includes a request to identify content associated with a second topic;

causing encrypted data representing the second topic to be stored in the database; and based at least in part on determining that the second utterance includes the request for the content, determining that the encrypted data representing the second topic is stored in the database;

wherein the third audio data further represents at least a portion of a second content item associated with the second topic.

8. The method as recited in claim 4, further comprising:

receiving, from the electronic device, fourth audio data representing a third utterance;

determining, based at least in part on the fourth audio data, intent data associated with the third utterance;

generating, based at least in part on the intent data, a response to the third utterance;

performing voice recognition on the fourth audio data;

determining, based at least in part on performing the voice recognition on the fourth audio data, that the third utterance is from a user associated with the user profile;

determining that the content item related to the topic is stored in the database;

generating a query regarding whether to output the content item; and sending, to the electronic device, fifth audio data representing at least the response and the query.

9. The method as recited in claim 4, further comprising:

receiving, from the electronic device, data indicating a presence of a user;

based at least in part on receiving the data, determining that the user is associated with the user profile;

determining that the content item related to the topic is stored in a database;

generating a query regarding whether to output the content item related to the topic; and sending, to the electronic device, fourth audio data representing at least the query.

10. The method as recited in claim 4, further comprising:

performing voice recognition on the first audio data;

determining, based at least in part on performing the voice recognition on the first audio data, that the first utterance is from a user associated with the user profile;

performing voice recognition on the second audio data; and determining, based at least in part on performing the voice recognition on the second audio data, that the second utterance is from the user associated with the user profile;

wherein determining that the encrypted data representing the topic is stored in the database is further based at least in part on determining that the user is associated with the second utterance.

11. The method as recited in claim 4, wherein the third audio data represents the portion of the content item, and wherein the method further comprises:

receiving, from the electronic device, fourth audio data representing a third utterance;

determining, based at least in part on the fourth audio data, that the third utterance includes a request for an entirety of the content item;

based at least in part on the determining that the third utterance includes the request for the entirety of the content item; generating fifth audio data representing the entirety of the content item; and sending, to the electronic device, the fifth audio data.

12. The method of claim 4, further comprising:

performing voice recognition on the first audio data;

determining, based at least in part on the performing the voice recognition on the first audio data, that the first utterance is from a user associated with the user profile;

performing voice recognition on the second audio data; and determining, based at least in part on the performing the voice recognition on the second audio data, that the second utterance is from the user associated with the user profile, wherein the determining that the encrypted data representing the topic is stored in the database is further based at least in part on the determining that the second utterance is from the user associated with the user profile.

13. The method as recited in claim 4, further comprising:

based at least in part on determining that the second utterance includes the request for the content related to the topics, determining that additionally encrypted data representing an additional topic is stored in the database; and sending, to the electronic device, fourth audio data representing at least a portion of an additional content item that is related to the additional topic.

14. The method as recited in claim 4, further comprising:

determining, based at least in part on performing voice recognition on the second audio data, that the second utterance is from a user associated with the user profile; and based at least in part on determining that the second utterance is from the user, determining to provide access to the content item related to the topic.

15. The method as recited in claim 4, further comprising causing the encrypted data represented by the topic to be generated, wherein the database stores at least the encrypted data and additional encrypted data representing at least an additional topic included in the second list of topics.

16. A system comprising:

one or more processors; and one or more computer-readable media storing instructions that, when executed by the one or more processors, cause the one or more processor to perform operations comprising:

receiving first audio data from an electronic device;

determining that the first audio data represents a first instruction to add a topic to a first list of topics;

sending data representing the topic to a first component configured to identify topics that are included in a second list of topics;

receiving, from the first component, an indication that the topic is included in the second list of topics;

causing an indication of the topic to be added to the first list of topics;

receiving second audio data from the electronic device;

determining that the second audio data represents a second instruction to output content associated with topics included in the first list of topics;

based at least in part on determining that the second audio data represents the second instruction, determining that the topic is included in the first list of topics; and sending, to the electronic device, third audio data representing at least a portion of a content item associated with the topic.

17. The system as recited in claim 16, the content item comprising a first content item and the operations further comprising:
   identifying the first content item associated with the topic;
   identifying a second content item associated with the topic;
   analyzing the first content item to determine a first date associated with the first content item;
   analyzing the second content item to determine a second date associated with the second content item;
   determining, based at least in part on the first date and the second date, an order for outputting the first content item and the second content item; and
   generating the third audio data based at least in part on the order, wherein the third audio data further represents at least a portion of the second content item.

18. The system as recited in claim 16, the content item comprising a first content item and the operations further comprising:
   identifying the first content item associated with the topic;
   identifying a second content item associated with the topic;
   determining a number of times that the topic is included in the first content item;
   determining a first correlation score for the first content item based at least in part on the number of times that the topic is included in the first content item;
   determining a number of times that the topic is included in the second content item;
   determining a second correlation score for the second content item based at least in part on the number of times that the topic is included in the second content item;
   determining, based at least in part on the first correlation score and the second correlation score, an order for outputting the first content item and the second content item; and
   generating the third audio data based at least in part on the order, wherein the third audio data further represents at least a portion of the second content item.

19. The system as recited in claim 16, wherein the topic comprises a first topic and the content item comprises a first content item, and wherein the operations further comprise:
   receiving fourth audio data from the electronic device;
   determining that the fourth audio data represents a third instruction to add a second topic to the first list of topics;
   causing an indication of the second topic to be added to the first list of topics;
   based at least in part on determining that the second audio data represents the second instruction, determining that the second topic is included in the first list of topics; and
   generating the third audio data, wherein the third audio data further represents at least a portion of a second content item associated with the second topic.

20. The system as recited in claim 16, the operations further comprising:
   receiving, from the electronic device, fourth audio data representing an utterance;
   determining, based at least in part on the fourth audio data, intent data associated with the utterance;
   generating, based at least in part on the intent data, a response to the utterance;
   performing voice recognition on the fourth audio data;
   determining, based at least in part on performing the voice recognition on the fourth audio data, that the utterance is from a user associated with a user profile, wherein the user profile is associated with a list of entities;
   determining that the content item related is stored in a database;
   generating a query regarding whether to output the content item; and
   sending, to the electronic device, fifth audio data representing at least the response and the query.

* * * * *